United States Patent
Chi et al.

(10) Patent No.: US 10,455,014 B2
(45) Date of Patent: Oct. 22, 2019

(54) METHOD AND APPARATUS FOR SYNCHRONIZING CONTENT

(71) Applicant: HUAWEI DEVICE (SHENZHEN) CO., LTD., Shenzhen (CN)

(72) Inventors: Haizhang Chi, Shenzhen (CN); Zongjun Yang, Shenzhen (CN)

(73) Assignee: Huawei Device Co., Ltd., Dongguan (CN)

( * ) Notice: Subject to any disclaimer, the term of this patent is extended or adjusted under 35 U.S.C. 154(b) by 646 days.

(21) Appl. No.: 14/586,082

(22) Filed: Dec. 30, 2014

(65) Prior Publication Data

US 2015/0120655 A1 Apr. 30, 2015

Related U.S. Application Data

(63) Continuation of application No. PCT/CN2013/086031, filed on Oct. 28, 2013.

(30) Foreign Application Priority Data

Oct. 26, 2012 (CN) .......................... 2012 1 0417191

(51) Int. Cl.
    *G06F 15/16* (2006.01)
    *H04L 29/08* (2006.01)
    *G06F 16/27* (2019.01)

(52) U.S. Cl.
    CPC ........ *H04L 67/1095* (2013.01); *G06F 16/273* (2019.01); *H04L 67/26* (2013.01)

(58) Field of Classification Search
None
See application file for complete search history.

(56) References Cited

U.S. PATENT DOCUMENTS 8,739,249 B1 * 5/2014 Kay .................. G06F 21/00
    709/217
2005/0203905 A1 9/2005 Jung et al.
(Continued)

FOREIGN PATENT DOCUMENTS

| CN | 101262497 | 9/2008 |
|---|---|---|
| CN | 101404670 | 4/2009 |
| CN | 102932439 | 2/2013 |

OTHER PUBLICATIONS

Extended European Search Report dated Jul. 8, 2015 for corresponding European Patent Application No. 13849209.5.
(Continued)

*Primary Examiner* — Umar Cheema
*Assistant Examiner* — Anthony T Rotolo
(74) *Attorney, Agent, or Firm* — Slater Matsil, LLP

(57) ABSTRACT

Embodiments of the present invention provide a method for synchronizing content and relate to the field of communications. The method includes: determining, by a synchronization server, a terminal device that needs to perform content synchronization; determining, by the synchronization server, a unique identifier of the terminal device that needs to perform content synchronization and a unique identifier of a synchronization application; and sending, by the synchronization server, a synchronization message to a push server, where the synchronization message includes the unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation.

12 Claims, 9 Drawing Sheets

(56) References Cited

U.S. PATENT DOCUMENTS

| | | | |
|---|---|---|---|
| 2008/0194276 A1 | 8/2008 | Lin et al. | |
| 2009/0228509 A1* | 9/2009 | McCarthy | G06F 17/30165 |
| 2009/0228606 A1* | 9/2009 | McCarthy | H04L 67/1097 |
| | | | 709/248 |
| 2010/0088430 A1* | 4/2010 | Ton | H04W 8/20 |
| | | | 709/248 |
| 2012/0290740 A1* | 11/2012 | Tewari | H04W 4/00 |
| | | | 709/248 |
| 2013/0151728 A1* | 6/2013 | Currier | H04N 21/242 |
| | | | 709/248 |
| 2013/0246560 A1* | 9/2013 | Feng | H04L 29/0809 |
| | | | 709/217 |

OTHER PUBLICATIONS

International Search Report dated Feb. 6, 2014 in corresponding International Application No. PCT/CN2013/086031.
PCT International Search Report dated Feb. 6, 2014 in corresponding International Patent Application No. PCT/CN2013/086031.
Ericsson et al., "SyncML Sync Protocol, version 1.1", Feb. 15, 2002, pp. 1-62 <www.syncml.org/docs/syncml_sync_protocol_v11_20020215.pdf>.

* cited by examiner

METHOD AND APPARATUS FOR SYNCHRONIZING CONTENT

CROSS-REFERENCE TO RELATED APPLICATION

This application is a continuation of International Application No. PCT/CN2013/086031, filed on Oct. 28, 2013, which claims priority to Chinese Patent Application No. 201210417191.2, filed on Oct. 26, 2012, both of which are hereby incorporated by reference in their entireties.

TECHNICAL FIELD

The present invention relates to the field of communications, and in particular, to a method and an apparatus for synchronizing content.

BACKGROUND

Content synchronization refers to a technical means of synchronization performed for maintaining consistency of data content between devices or between a device and a server.

Currently, content synchronization includes synchronization of contacts, SMS messages and call records based on the SyncML (Synchronization Markup Language, Synchronization Markup Language), mail synchronization based on the IMAP (Internet Mail Access Protocol, Internet Mail Access Protocol) protocol, and session message synchronization based on the SIP (Session Initiation Protocol, Session Initiation Protocol). These synchronization manners can all implement a function of synchronization between a terminal and a cloud.

However, when content synchronization is performed in the foregoing synchronization manners, a terminal device must initiate a connection for the synchronization, and keep requesting, in a polling manner, from a server whether content is updated. As a result, the load of the terminal device is increased and the processing efficiency of the terminal device is reduced.

SUMMARY

Embodiments of the present invention provide a method and an apparatus for synchronizing content, where a synchronization server can actively initiate content synchronization, thereby reducing the load of a terminal device, and improving the processing efficiency.

According to a first aspect of the present invention, a method for synchronizing content is provided, where the method includes:

determining, by a synchronization server, a terminal device that needs to perform content synchronization;

determining, by the synchronization server, an ID unique identifier of the terminal device that needs to perform content synchronization and a unique identifier of a synchronization application; and sending, by the synchronization server, a synchronization message to a push server, where the synchronization message includes the ID unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation.

In a first possible implementation manner of the first aspect, before the determining, by a synchronization server, a terminal device that needs to perform content synchronization, the method further includes:

receiving, by the synchronization server, registration information sent by a terminal device, where the registration information includes the ID unique identifier of the terminal device and the unique identifier of the synchronization application; and the determining, by the synchronization server, an ID unique identifier of the terminal device that needs to perform content synchronization and a unique identifier of a synchronization application includes: determining, by the synchronization server, the ID unique identifier of the terminal device that needs to perform content synchronization and the unique identifier of the synchronization application according to registration information of the terminal device that needs to perform content synchronization.

With reference to the first aspect or the first possible implementation manner of the first aspect, in a second possible implementation manner, the determining, by a synchronization server, a terminal device that needs to perform content synchronization includes:

determining, by the synchronization server, a user corresponding to a terminal device that initiates a synchronization operation;

determining, by the synchronization server, all terminal devices associated with the user; and determining, by the synchronization server, that a terminal device, which satisfies a preset content synchronization condition, of all terminal devices associated with the user is the terminal device that needs to perform content synchronization;

or, the determining, by a synchronization server, a terminal device that needs to perform content synchronization includes:

determining, by the synchronization server, a user corresponding to a terminal device that initiates a synchronization operation;

determining, by the synchronization server, a buddy of the user;

determining, by the synchronization server, all terminal devices associated with the buddy; and determining, by the synchronization server, that a terminal device, which satisfies a preset content synchronization condition, of all terminal devices associated with the buddy is the terminal device that needs to perform content synchronization;

or, the determining, by a synchronization server, a terminal device that needs to perform content synchronization includes:

determining, by the synchronization server, a user corresponding to a terminal device that initiates a synchronization operation;

determining, by the synchronization server, terminal devices which perform content synchronization, which are specified by the user; and determining, by the synchronization server, that a terminal device, which satisfies a preset content synchronization condition, of the specified terminal devices which perform content synchronization is the terminal device that needs to perform content synchronization.

According to a second aspect of the present invention, a method for synchronizing content is provided, where the method includes:

receiving, by a terminal device, a synchronization message sent by a push server, where the synchronization message includes a unique identifier of a synchronization application, a command word, and auxiliary information, where the command word is used to indicate a synchronization operation that needs to be performed by a terminal device that needs to perform content synchronization, and the auxiliary information includes a necessary parameter for implementing the synchronization operation; and performing, by the terminal device, a synchronization operation according to the unique identifier of the synchronization application, the command word, and the auxiliary information, where the synchronization operation includes a deletion operation.

In a first possible implementation manner of the second aspect, before the receiving, by a terminal device, a synchronization message sent by a push server, the method further includes:

sending, by the terminal device, first registration information to the push server, where the first registration information includes an ID unique identifier of the terminal device and a synchronization application ID name;

receiving, by the terminal device, the unique identifier of the synchronization application sent by the push server, where the unique identifier of the synchronization application is generated by the push server according to the ID unique identifier of the terminal device and the synchronization application ID name; and sending, by the terminal device, second registration information to a synchronization server, where the second registration information includes the ID unique identifier of the terminal device and the unique identifier of the synchronization application.

With reference to the second aspect or the first possible implementation manner of the second aspect, in a second possible implementation manner, the synchronization operation further includes an addition operation and a modification operation, and the method further includes:

connecting, by the terminal device, to the synchronization server and obtaining synchronization content, so as to perform the addition operation and/or the modification operation.

According to a third aspect of the present invention, a method for synchronizing content is provided, where the method includes:

receiving, by a push server, a synchronization message sent by a synchronization server, where the synchronization message includes an ID unique identifier of a terminal device that needs to perform content synchronization, a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

parsing, by the push server, the synchronization message to obtain the unique identifier of the terminal device that needs to perform content synchronization;

determining, by the push server, according to the unique identifier of the terminal device that needs to perform content synchronization, whether the terminal device that needs to perform content synchronization is online; and sending, by the push server when the terminal device that needs to perform content synchronization is online, the synchronization message to the terminal device that needs to perform content synchronization.

In a first possible implementation manner of the third aspect, before the receiving, by a push server, a synchronization message sent by a synchronization server, the method further includes:

receiving, by the push server, registration information sent by the terminal device, where the registration information includes the ID unique identifier of the terminal device and a synchronization application ID name; and generating, by the push server, the unique identifier of the synchronization application according to the registration information, and sending the unique identifier of the synchronization application to the terminal device.

According to a fourth aspect of the present invention, a method for synchronizing content is provided, where the method includes:

determining, by a synchronization server, a terminal device that needs to perform content synchronization;

determining, by the synchronization server, an ID unique identifier of the terminal device that needs to perform content synchronization and a unique identifier of a synchronization application;

sending, by the synchronization server, a first synchronization message to a push server, where the first synchronization message includes the ID unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

receiving, by the push server, the first synchronization message sent by the synchronization server;

parsing, by the push server, the first synchronization message to obtain the unique identifier of the terminal device that needs to perform content synchronization;

determining, by the push server according to the unique identifier of the terminal device that needs to perform content synchronization, whether the terminal device that needs to perform content synchronization is online; and sending, by the push server when the terminal device that needs to perform content synchronization is online, a second synchronization message to the terminal device that needs to perform content synchronization, where the second synchronization message includes the unique identifier of the synchronization application, the command word, and the auxiliary information;

receiving, by the terminal device that needs to perform content synchronization, the second synchronization message sent by the push server; and performing, by the terminal device, a synchronization operation according to the unique identifier of the synchronization application, the command word, and the auxiliary information that are included in the second synchronization message, where the synchronization operation includes a deletion operation.

In a first possible implementation manner of the fourth aspect, before the determining, by a synchronization server, a terminal device that needs to perform content synchronization, the method further includes:

sending, by the terminal device, first registration information to the push server, where the first registration information includes an ID unique identifier of the terminal device and a synchronization application ID name;

receiving, by the push server, the first registration information sent by the terminal device;

generating, by the push server, the unique identifier of the synchronization application according to the first registration information, and sending the unique identifier of the synchronization application to the terminal device;

receiving, by the terminal device, the unique identifier of the synchronization application;

sending, by the terminal device, second registration information to a synchronization server, where the second registration information includes the ID unique identifier of the terminal device and the unique identifier of the synchronization application; and receiving, by the synchronization server, the second registration information sent by the terminal device.

According to a fifth aspect of the present invention, a synchronization server is provided, where the synchronization server includes:

a synchronization control unit, configured to determine a terminal device that needs to perform content synchronization, where the synchronization control unit is configured to determine a ID unique identifier of the terminal device that needs to perform content synchronization and a unique identifier of a synchronization application; and a sending unit, configured to send a synchronization message to a push server, where the synchronization message includes the ID unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation.

In a first possible implementation manner of the fifth aspect, the synchronization server further includes:

a receiving unit, configured to: before the synchronization control unit determines the terminal device that needs to perform content synchronization, receive registration information sent by the terminal device, where the registration information includes the ID unique identifier of the terminal device and the unique identifier of the synchronization application; and the synchronization control unit is specifically configured to determine, according to the registration information, received by the receiving unit, of the terminal device that needs to perform content synchronization, the ID unique identifier of the terminal device that needs to perform content synchronization and the unique identifier of the synchronization application.

With reference to the fifth aspect or the first possible implementation manner of the fifth aspect, in a second possible implementation manner of the fifth aspect, the synchronization control unit is specifically configured to:

determine a user corresponding to a terminal device that initiates a synchronization operation;

determine all terminal devices associated with the user; and determine that a terminal device, which satisfies a preset content synchronization condition, of all terminal devices associated with the user is the terminal device that needs to perform content synchronization;

or, the synchronization control unit is specifically configured to:

determine a user corresponding to a terminal device that initiates a synchronization operation;

determine a buddy of the user;

determine all terminal devices associated with the buddy; and determine that a terminal device, which satisfies a preset content synchronization condition, of all terminal devices associated with the buddy is the terminal device that needs to perform content synchronization;

or, the synchronization control unit is specifically configured to:

determine a user corresponding to a terminal device that initiates a synchronization operation;

determine terminal devices which perform content synchronization, which are specified by the user; and determine that a terminal device, which satisfies a preset content synchronization condition, of the specified terminal devices which perform content synchronization is the terminal device that needs to perform content synchronization.

According to a sixth aspect of the present invention, a terminal device is provided, where the terminal device includes:

a receiving unit, configured to receive a synchronization message sent by a push server, where the synchronization message includes a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation; and a synchronizing unit, configured to perform a synchronization operation according to the unique identifier of the synchronization application, the command word, and the auxiliary information that are received by the receiving unit, where the synchronization operation includes a deletion operation.

In a first possible implementation manner of the sixth aspect, the terminal device further includes:

a sending unit, configured to send first registration information to the push server, where the first registration information includes an ID unique identifier of the terminal device and a synchronization application ID name, where the receiving unit is further configured to receive the unique identifier of the synchronization application sent by the push server, where the unique identifier of the synchronization application is generated by the push server according to the ID unique identifier of the terminal device and the synchronization application ID name; and the sending unit is further configured to send second registration information to a synchronization server, where the second registration information includes the ID unique identifier of the terminal device and the unique identifier of the synchronization application.

With reference to the sixth aspect or the first possible implementation manner of the sixth aspect, in a second possible implementation manner of the sixth aspect, the synchronization operation further includes an addition operation and a modification operation, and the synchronizing unit is further configured to connect to the synchronization server and obtain synchronization content, so as to perform the addition operation and/or the modification operation.

According to a seventh aspect of the present invention, a push server is provided, where the push server includes:

a receiving unit, configured to receive a synchronization message sent by a synchronization server, where the synchronization message includes an ID unique identifier of a terminal device that needs to perform content synchronization, a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

a processing unit, configured to parse the synchronization message received by the receiving unit, to obtain the unique identifier of the terminal device that needs to perform content synchronization; and determine, according to the unique identifier of the terminal device that needs to perform content synchronization, whether the terminal device that needs to perform content synchronization is online; and a push unit, configured to send, when the terminal device that needs to perform content synchronization is online, the synchronization message to the terminal device that needs to perform content synchronization.

In a first possible implementation manner of the seventh aspect, the receiving unit is further configured to receive registration information sent by the terminal device, where the registration information includes the ID unique identifier of the terminal device and a synchronization application ID name;

the processing unit is further configured to generate the unique identifier of the synchronization application according to the registration information received by the receiving unit; and the push unit is further configured to send the unique identifier of the synchronization application to the terminal device.

According to an eighth aspect of the present invention, a network system is provided, where the network system includes a synchronization server, a terminal device, and a push server, where:

the synchronization server is configured to determine a terminal device that needs to perform content synchronization; determine an ID unique identifier of the terminal device that needs to perform content synchronization and a unique identifier of a synchronization application; and send a first synchronization message to the push server, where the first synchronization message includes the ID unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

the push server is configured to receive the first synchronization message sent by the synchronization server; parse the first synchronization message to obtain the unique identifier of the terminal device that needs to perform content synchronization; determine, according to the unique identifier of the terminal device that needs to perform content synchronization, whether the terminal device that needs to perform content synchronization is online; and send, when the terminal device that needs to perform content synchronization is online, a second synchronization message to the terminal device that needs to perform content synchronization, where the second synchronization message includes the unique identifier of the synchronization application, the command word, and the auxiliary information; and the terminal device is configured to receive the second synchronization message sent by the push server; and perform a synchronization operation according to the unique identifier of the synchronization application, the command word, and the auxiliary information that are included in the second synchronization message, where the synchronization operation includes a deletion operation.

In a first possible implementation manner of the eighth aspect, the terminal device is further configured to send first registration information to the push server before the synchronization server determines the terminal device that needs to perform content synchronization, where the first registration information includes an ID unique identifier of the terminal device and a synchronization application ID name;

the push server is further configured to receive the first registration information sent by the terminal device; and generate the unique identifier of the synchronization application according to the first registration information and send the unique identifier of the synchronization application to the terminal device;

the terminal device is further configured to receive the unique identifier of the synchronization application; and send second registration information to the synchronization server, where the second registration information includes the ID unique identifier of the terminal device and the unique identifier of the synchronization application; and the synchronization server is further configured to receive the second registration information sent by the terminal device.

After the foregoing technical solutions are used, in the method for synchronizing content, the terminal device, the synchronization server, the push server and the network system that are provided in the embodiments of the present invention, the synchronization server determines a terminal device that needs to perform content synchronization, and sends a first synchronization message to the push server, where the first synchronization message includes an ID of the terminal device that needs to perform content synchronization, a unique identifier of a synchronization application, a command word, and auxiliary information. In this way, after receiving the first synchronization message, the push server can send a second synchronization message to a corresponding terminal device according to the ID of the terminal device that needs to perform content synchronization, where the second synchronization message includes the unique identifier of the synchronization application, the command word, and the auxiliary information, and then the corresponding terminal device can perform content synchronization according to the command word and the auxiliary information. In the technical solutions, the synchronization server actively initiates content synchronization, so that the terminal device does not need to initiate a connection and keep requesting, in a polling manner, from a server whether content is updated, thereby reducing a load of the terminal device and improving the processing efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
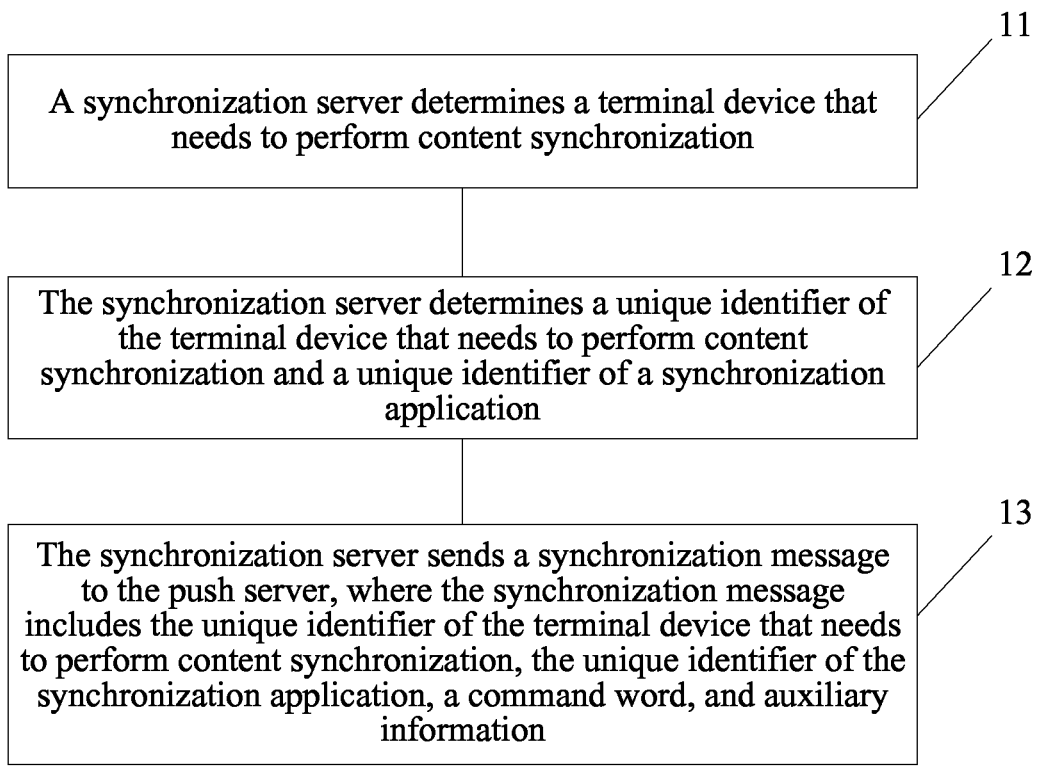
FIG. 1 is a flowchart of a method for synchronizing content according to an embodiment of the present invention.

FIG. 1 is a flowchart of a method for synchronizing content according to an embodiment of the present invention. Referring to FIG. 1, the embodiment of the present invention provides a method for synchronizing content, which is described based on a synchronization server, and the method may include:

11: A synchronization server determines a terminal device that needs to perform content synchronization.

In the embodiment of the present invention, the synchronization server may determine, according to user setting, a terminal device that needs to perform content synchronization in various manners. The following provides specific description.

A manner for the synchronization server to determine a terminal device that needs to perform content synchronization may be:

determining, by the synchronization server, a user corresponding to a terminal device that initiates a synchronization operation;

determining, by the synchronization server, all terminal devices associated with the user; and determining, by the synchronization server, that a terminal device, which satisfies a preset content synchronization condition, of all terminal devices associated with the user is the terminal device that needs to perform content synchronization.

Another manner for the synchronization server to determine a terminal device that needs to perform content synchronization may be:

determining, by the synchronization server, a user corresponding to a terminal device that initiates a synchronization operation;

determining, by the synchronization server, a buddy of the user;

determining, by the synchronization server, all terminal devices associated with the buddy; and determining, by the synchronization server, that a terminal device, which satisfies a preset content synchronization condition, of all terminal devices associated with the buddy is the terminal device that needs to perform content synchronization.

Still another manner for the synchronization server to determine a terminal device that needs to perform content synchronization may be:

determining, by the synchronization server, a user corresponding to a terminal device that initiates a synchronization operation;

determining, by the synchronization server, terminal devices which perform content synchronization, which are specified by the user; and determining, by the synchronization server, that a terminal device, which satisfies a preset content synchronization condition, of the specified terminal devices which perform content synchronization is the terminal device that needs to perform content synchronization.

The determining, by the synchronization server, a user corresponding to a terminal device that initiates a synchronization operation may be: receiving, by the synchronization server, account information of the user, and determining, according to the account information of the user, the user corresponding to the terminal device that initiates the synchronization operation, where the account information of the user may be sent by the user to the synchronization server when the user logs on to a synchronization application.

It can be seen from the foregoing that, the synchronization server may perform content synchronization on at least one terminal device of the user, the synchronization server may also perform content synchronization on a terminal device of a buddy of the user, and the synchronization server may also perform content synchronization on a specified terminal device.

12: The synchronization server determines a unique identifier of the terminal device that needs to perform content synchronization and a unique identifier of a synchronization application.

After determining the terminal device that needs to perform content synchronization, the synchronization server needs to determine the unique identifier of the terminal device that needs to perform content synchronization and the unique identifier of the synchronization application, so as to send the information to the push server. Then, the push server determines, according to the unique identifier of the terminal device, a corresponding terminal device that needs to perform content synchronization, and then the terminal device invokes, according to the unique identifier of the synchronization application, a corresponding synchronization application to perform content synchronization.

Optionally, before step 11, the terminal device may send registration information to the synchronization server, where the registration information includes the unique identifier of the terminal device and the unique identifier of the synchronization application. The synchronization server may receive the registration information sent by the terminal device, and obtain the unique identifier of the terminal device and the unique identifier of the synchronization application according to the registration information.

In the embodiment of the present invention, the unique identifier of the synchronization application may be formed by: a unique identifier of a device+a synchronization application name+another identifier, where the another identifier may be a random string, and the synchronization application name may uniquely identify a synchronization application in a terminal device to which the synchronization application belongs; and the unique identifier of the synchronization application may uniquely identify the synchronization application in all synchronization applications.

13: The synchronization server sends a synchronization message to the push server, where the synchronization message includes the unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation.

In the method for synchronizing content provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing a load of the terminal device and improving the processing efficiency.

Figure 2:
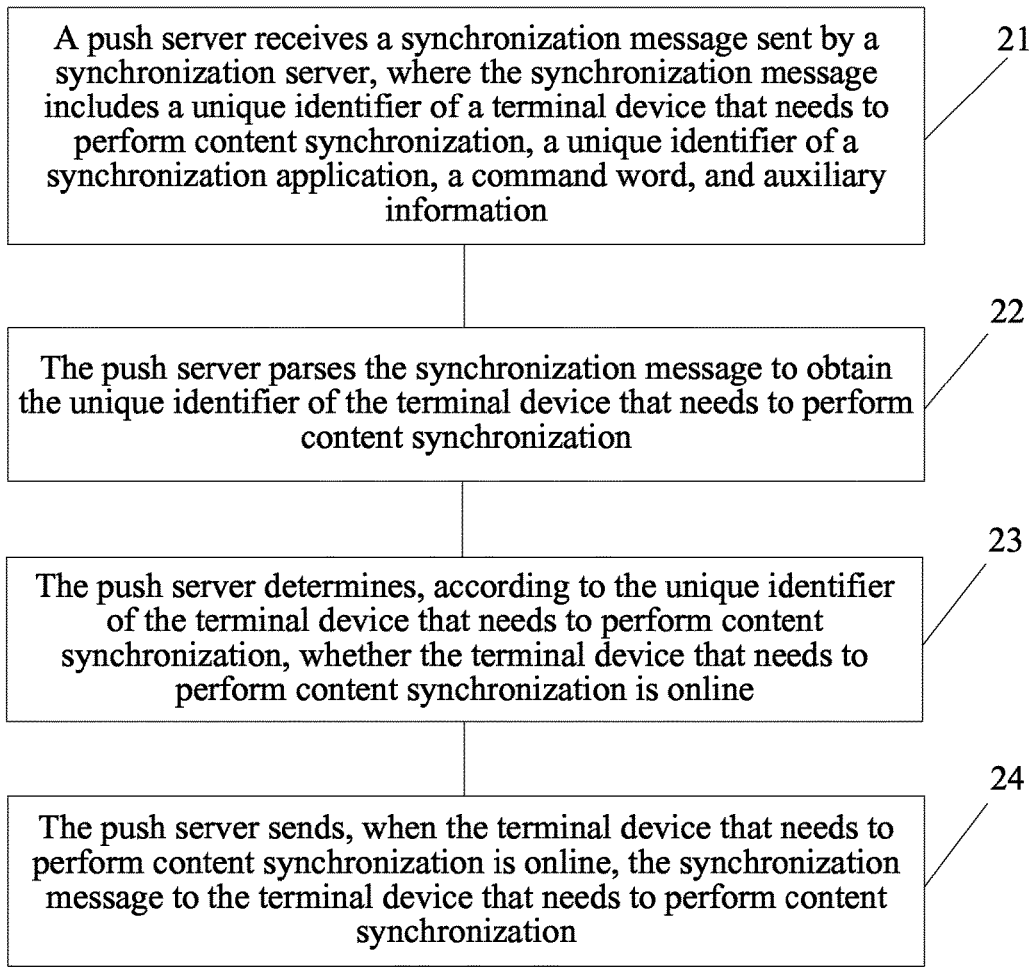
FIG. 2 is a flowchart of a method for synchronizing content according to an embodiment of the present invention.

FIG. 2 is a flowchart of a method for synchronizing content according to an embodiment of the present invention. Referring to FIG. 2, the embodiment of the present invention provides a method for synchronizing content, which is described based on a push server, and the method may include:

21: A push server receives a synchronization message sent by a synchronization server, where the synchronization message includes a unique identifier of a terminal device that needs to perform content synchronization, a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation.

Before this step, the terminal device may send registration information to the push server, where the registration information includes a unique identifier of the terminal device and a synchronization application name, and the push server may receive the registration information sent by the terminal device, save the unique identifier of the terminal device and a corresponding connection state, generate the unique identifier of the synchronization application according to the registration information, and send the unique identifier of the synchronization application to the terminal device.

In the embodiment of the present invention, the unique identifier of the synchronization application may be formed by: a unique identifier of a device+a synchronization application name+another identifier, where the another identifier may be a random string, and the synchronization application name may uniquely identify a synchronization application in a terminal device to which the synchronization application belongs; and the unique identifier of the synchronization application may uniquely identify the synchronization application in all synchronization applications.

22: The push server parses the synchronization message to obtain the unique identifier of the terminal device that needs to perform content synchronization.

23: The push server determines, according to the unique identifier of the terminal device that needs to perform content synchronization, whether the terminal device that needs to perform content synchronization is online.

24: The push server sends, when the terminal device that needs to perform content synchronization is online, the synchronization message to the terminal device that needs to perform content synchronization, so that the terminal device that needs to perform content synchronization performs a synchronization operation according to the unique identifier of the synchronization application, the command word, and the auxiliary information.

In the method for synchronizing content provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing a load of the terminal device and improving the processing efficiency.

Figure 3:
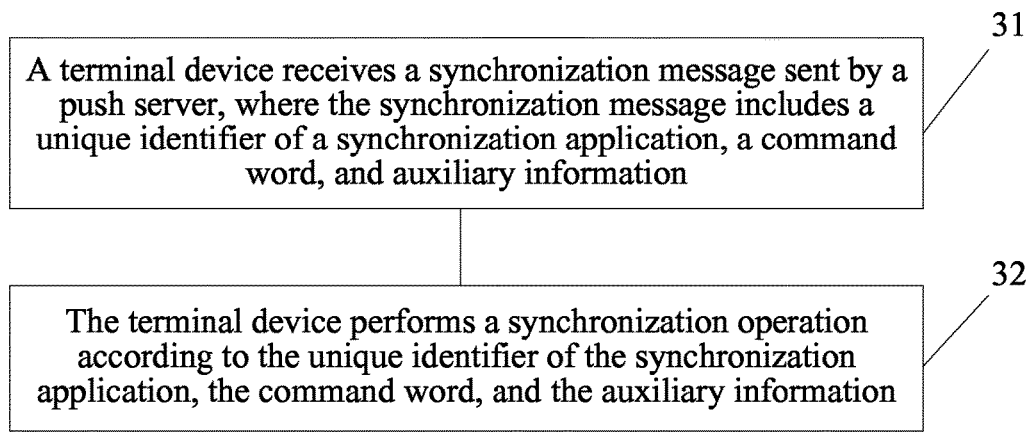
FIG. 3 is a flowchart of a method for synchronizing content according to an embodiment of the present invention.

FIG. 3 is a flowchart of a method for synchronizing content according to an embodiment of the present invention. Referring to FIG. 3, the embodiment of the present invention provides a method for synchronizing content, which is described based on a terminal device, and the method may include:

31: A terminal device receives a synchronization message sent by a push server, where the synchronization message includes a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation.

Before this step, the terminal device may be registered with the push server and the synchronization server separately.

Specifically, in an initialization phase, the terminal device may send first registration information to the push server, where the first registration information includes a unique identifier of the terminal device and a synchronization application name. After receiving the registration information sent by the terminal device, the push server saves the unique identifier of the terminal device and a corresponding connection state, generates the unique identifier of the synchronization application according to the first registration information, and sends the unique identifier of the synchronization application to the terminal device. The terminal device receives the unique identifier of the synchronization application sent by the push server. In addition, the terminal device may further send second registration information to the synchronization server, where the second registration information includes the unique identifier of the terminal device and the unique identifier of the synchronization application.

32: The terminal device performs a synchronization operation according to the unique identifier of the synchronization application, the command word, and the auxiliary information, where the synchronization operation includes a deletion operation.

When the synchronization operation is the deletion operation, the terminal device may directly perform the deletion operation on a local file without connecting to the synchronization server.

In addition, in the embodiment of the present invention, the synchronization operation may further include an addition operation and a modification operation, and when the synchronization operation is the addition operation and/or the modification operation, the method may further include:

connecting, by the terminal device, to the synchronization server and obtaining synchronization content, so as to perform the addition operation and/or the modification operation.

In the method for synchronizing content provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

The embodiment of the present invention further provides a method for synchronizing content, where the method may include:

determining, by a synchronization server, a terminal device that needs to perform content synchronization;

determining, by the synchronization server, a unique identifier of the terminal device that needs to perform content synchronization and a unique identifier of a synchronization application;

sending, by the synchronization server, a first synchronization message to a push server, where the first synchronization message includes the unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

receiving, by the push server, the first synchronization message sent by the synchronization server;

parsing, by the push server, the first synchronization message to obtain the unique identifier of the terminal device that needs to perform content synchronization;

determining, by the push server, according to the unique identifier of the terminal device that needs to perform content synchronization, whether the terminal device that needs to perform content synchronization is online;

sending, by the push server when the terminal device that needs to perform content synchronization is online, a second synchronization message to the terminal device that needs to perform content synchronization, where the second synchronization message includes the unique identifier of the synchronization application, the command word, and the auxiliary information;

receiving, by the terminal device that needs to perform content synchronization, the second synchronization message sent by the push server; and performing, by the terminal device, a synchronization operation according to the unique identifier of the synchronization application, the command word, and the auxiliary information that are included in the second synchronization message, where the synchronization operation includes a deletion operation.

In the method for synchronizing content provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

Optionally, in an embodiment of the present invention, before the determining, by a synchronization server, a terminal device that needs to perform content synchronization, the method may further include:

sending, by the terminal device, first registration information to the push server, where the first registration information includes a unique identifier of the terminal device and a synchronization application name;

receiving, by the push server, the first registration information sent by the terminal device;

generating, by the push server, the unique identifier of the synchronization application according to the first registration information, and sending the unique identifier of the synchronization application to the terminal device;

receiving, by the terminal device, the unique identifier of the synchronization application;

sending, by the terminal device, second registration information to a synchronization server, where the second registration information includes the unique identifier of the terminal device and the unique identifier of the synchronization application; and receiving, by the synchronization server, the second registration information sent by the terminal device.

To better understand the present invention, the following further describes the present invention by using several specific embodiments as examples. It should also be noted that, the following listed embodiments are merely a part of embodiments of the present invention, and other embodiments readily figured out by a person skilled in the art according to the content of the present invention shall all fall within the scope of the present invention.

Before specific embodiments of the present invention are discussed specifically, an initialization phase of the embodiments of the present invention is described first. The initialization process may be implemented before a synchronization operation is initiated, that is, the following initialization process is executed first before the following embodiments.

The initialization process may include the following steps:

(1) A synchronization application in multiple terminal devices of a user carries a synchronization application name to be registered with a push service background of a terminal device to which the synchronization application belongs, and the push service background returns a unique identifier of this synchronization application according to a unique identifier of the terminal device and the synchronization application name, where the unique identifier of the synchronization application is formed by: a unique identifier of a terminal device+a synchronization application name+another identifier. The synchronization application name may uniquely identify a synchronization application in a terminal device to which the synchronization application belongs; and the unique identifier of the synchronization application may uniquely identify the synchronization application in all synchronization applications.

(2) A push service background in multiple terminal devices of the user carries a unique identifier of this terminal device and a unique identifier of a synchronization application to be registered with a cloud push server, and the cloud push server saves the unique identifier of the terminal device and a corresponding connection state and returns the unique identifier of the synchronization application (a unique identifier of a terminal device+a synchronization application name+another identifier), where the unique identifier of the synchronization application is the same as the unique identifier of the synchronization application returned by the push service background to the synchronization application in (1). The push service background of the terminal device maintains a long connection with the cloud push server to facilitate information push.

(3) A synchronization application in multiple terminal devices of the user sends registration information to a cloud synchronization server, and reports the unique identifier of the synchronization application and the unique identifier of the terminal device.

The following describes specific embodiments of the present invention.

Embodiment 1

In this embodiment, a certain terminal device of a user initiates a synchronization operation, and a synchronization application of another terminal device to which the user belongs, whether started or not (especially when the synchronization application is not started), may push a message by using a cloud push server and a push service background of the terminal device, and invoke, according to registration information of the synchronization application in the push service background, the synchronization application to perform content synchronization.

Figure 4:
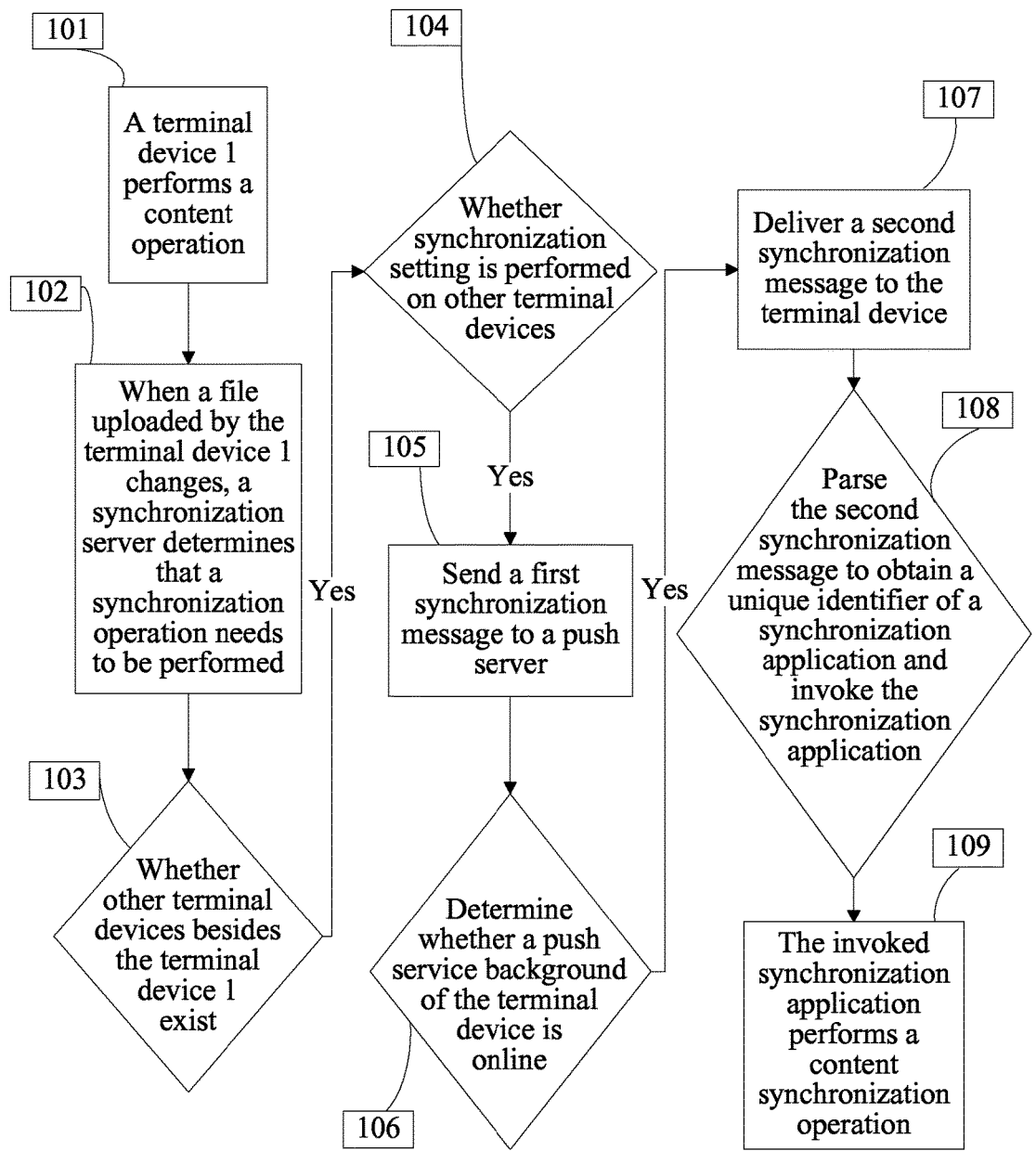
FIG. 4 is a specific flowchart of a method for synchronizing content according to an embodiment of the present invention.

Referring to FIG. 4, the method for synchronizing content provided in this embodiment may include:

Step 101: A terminal device 1 of a user performs a content operation, where the content operation includes an addition operation, a deletion operation and a modification (content modification or metadata modification) operation.

Step 102: When a file uploaded by the terminal device 1 changes, a synchronization server determines that a synchronization operation needs to be performed. Whether the file uploaded by the terminal device 1 changes may be determined as follows: If a file is added or a file is deleted, it indicates that the file changes; and If a file is modified, whether the file changes is determined by determining, according to a digest algorithm, whether a digest value changes before and after the file is modified, and if the digest value changes before and after the file is modified, it is determined that the file changes, and if the digest value does not change before and after the file is modified, it is determined that the file does not change.

Step 103: The synchronization server determines whether the user corresponding to the terminal device 1 has another terminal device besides the terminal device 1 that initiates an operation.

Step 104: If the user has another terminal device besides the terminal device 1 that initiates an operation, the synchronization server checks one by one whether content synchronization and a type of synchronization content are set for each terminal device of the user, where the type of synchronization content can only be a file type.

Step 105: When determining that a terminal device that needs to perform content synchronization exists, the synchronization server queries a unique identifier of the terminal device which is reported by the terminal device to the synchronization server and a corresponding unique identifier of a synchronization application, to generate a first synchronization message, where the first synchronization message includes the unique identifier of the synchronization application, the unique identifier of the terminal device, a command word, and auxiliary information, where the command word is used to indicate a synchronization operation that needs to be performed by the terminal device that needs to perform content synchronization, the auxiliary information includes a necessary parameter for implementing the synchronization operation, and the auxiliary information may specifically be metadata information of a file (such as a file name and a path); and sends the first synchronization message to a cloud push server through an interface.

Step 106: The cloud push server parses the first synchronization message to obtain the unique identifier of the terminal device, and queries, according to the unique identifier of the terminal device, whether a push service background of the terminal device is online.

Step 107: If the push service background of the terminal device is online, the push server pushes a second synchronization message to the push service background of the terminal device, where the second synchronization message includes the unique identifier of the synchronization application, the command word, and the auxiliary information.

Step 108: After receiving the synchronization message, the push service background of the terminal device parses the second synchronization message to obtain a unique identifier of a synchronization application in the second synchronization message, queries information about a registered application, and invokes the synchronization application to perform a specific service operation. A corresponding android (android) intelligent terminal may be invoked in a broadcasting manner.

Step 109: The synchronization application decides different service operations according to the command word, and the auxiliary information that are transmitted by the push service background: if the command word indicates that addition and modification operations are performed, the synchronization application connects to a cloud synchronization server and obtains content to perform the addition and modification operations; and if the command word indicates that a deletion operation is performed, the deletion operation is directly performed on a local file.

In the method for synchronizing content provided in the embodiment of the present invention, a synchronization server determines a terminal device that needs to perform content synchronization, and sends a first synchronization message to a push server, where the first synchronization message includes an ID of the terminal device that needs to perform content synchronization, a unique identifier of a synchronization application, a command word, and auxiliary information. In this way, after receiving the first synchronization message, the push server can send a second synchronization message to a corresponding terminal device according to the ID of the terminal device that needs to perform content synchronization, where the second synchronization message includes the unique identifier of the synchronization application, the command word, and the auxiliary information, and then the corresponding terminal device can perform content synchronization according to the command word and the auxiliary information. In the technical solution, the synchronization server actively initiates content synchronization, and the terminal device does not need to initiate a connection and keep requesting, in a polling manner, from a server whether content is updated, thereby reducing the load of the terminal device and improving the processing efficiency.

Embodiment 2

In this embodiment, a user performs a content operation at a cloud entrance (for example, a browser), and after detecting a content change, no matter whether a synchronization application of a terminal device to which the user belongs is started (especially when the synchronization application is not started), a cloud synchronization server may instruct the synchronization application to push a message by using a cloud push server and a push service background of the terminal device, and invoke, according to registration information of the synchronization application in the push service background, the synchronization application in the terminal to perform content synchronization.

Figure 5:
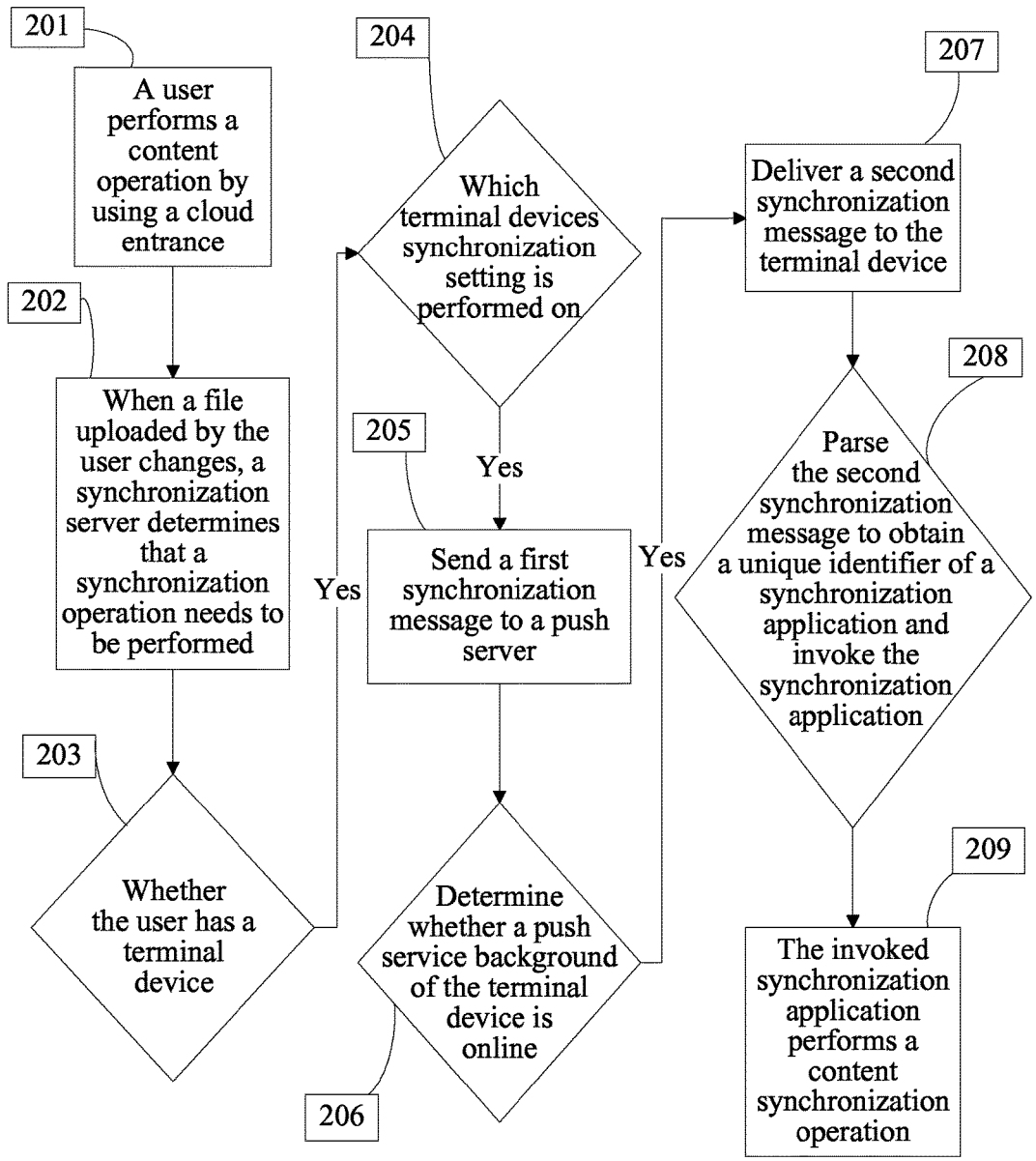
FIG. 5 is a specific flowchart of a method for synchronizing content according to an embodiment of the present invention.

Referring to FIG. 5, the method for synchronizing content provided in this embodiment may include:

Step 201: The user performs a content operation at a cloud entrance (for example, a browser), where the content operation includes an addition operation, a deletion operation and a modification (content modification or metadata modification) operation.

Step 202: When detecting that a file uploaded by the user changes, a synchronization server determines that a synchronization operation needs to be performed. Whether the uploaded file changes may be determined as follows: If a file is added or a file is deleted, it indicates that the file changes; and If a file is modified, whether the file changes is determined by determining, according to a digest algorithm, whether a digest value changes before and after the file is modified, and if the digest value changes before and after the file is modified, it is determined that the file changes, and if the digest value does not change before and after the file is modified, it is determined that the file does not change.

Step 203: The synchronization server determines whether the user has a terminal device.

Step 204: When the user has the terminal device, the synchronization server checks one by one whether content synchronization and a type of synchronization content are set for each terminal of the user, where the type of synchronization content can only be a file type.

Step 205: When determining that a terminal device that needs to perform content synchronization exists, the synchronization server queries a unique identifier of the terminal device which is reported by the terminal device to the synchronization server and a corresponding unique identifier of a synchronization application, to generate a first synchronization message, where the first synchronization message includes the unique identifier of the synchronization application, the unique identifier of the terminal device, a command word, and auxiliary information, where the command word is used to indicate a synchronization operation that needs to be performed by the terminal device that needs to perform content synchronization, the auxiliary information includes a necessary parameter for implementing the synchronization operation, and the auxiliary information may specifically be metadata information of a file (such as a file name and a path); and sends the first synchronization message to a cloud push server through an interface.

Step 206: The cloud push server parses the first synchronization message to obtain the unique identifier of the terminal device, and queries, according to the unique identifier of the terminal device, whether a push service background of the terminal device is online.

Step 207: If the push service background of the terminal device is online, the push server pushes a second synchronization message to the push service background of the terminal, where the second synchronization message includes the unique identifier of the synchronization application, the command word, and the auxiliary information.

Step 208: After receiving the synchronization message, the push service background of the terminal device parses the second synchronization message to obtain a unique identifier of a synchronization application in the second synchronization message, queries information about a registered application, and invokes the synchronization application to perform a specific service operation. A corresponding android (android) intelligent terminal may be invoked in a broadcasting manner.

Step 209: The synchronization application decides different service operations according to the command word, and the auxiliary information that are transmitted by the push service background: if the command word indicates that addition and modification operations are performed, the synchronization application connects to a cloud synchronization server and obtains content to perform the addition and modification operations; and if the command word indicates that a deletion operation is performed, the deletion operation is directly performed on a local file.

In the method for synchronizing content provided in the embodiment of the present invention, a synchronization server determines a terminal device that needs to perform content synchronization, and sends a first synchronization message to a push server, where the first synchronization message includes an ID of the terminal device that needs to perform content synchronization, a unique identifier of a synchronization application, a command word, and auxiliary information. In this way, after receiving the first synchronization message, the push server can send a second synchronization message to a corresponding terminal device according to the ID of the terminal device that needs to perform content synchronization, where the second synchronization message includes the unique identifier of the synchronization application, the command word, and the auxiliary information, and then the corresponding terminal device can perform content synchronization according to the command word and the auxiliary information. In the technical solution, the synchronization server actively initiates content synchronization, and the terminal device does not need to initiate a connection and keep requesting, in a polling manner, from a server whether content is updated, thereby reducing the load of the terminal device and improving the processing efficiency.

Embodiment 3

In this embodiment, a user may set content of the user at a cloud entrance, and besides synchronizing multiple devices of the user, may also synchronize content into a set device of a buddy.

After detecting a content change, no matter whether a synchronization application of a terminal device to which the user belongs is started (especially when the synchronization application is not started), a cloud synchronization server may instruct the synchronization application to push a message by using a cloud push server and a push service background of a terminal, and invoke, according to registration information of the synchronization application in the push service background, the synchronization application in the terminal to perform content synchronization.

In this embodiment, first, the user sets a buddy content synchronization condition at the cloud entrance.

The buddy content synchronization condition may be specifically set as: selecting a buddy by a user; selecting a buddy device that needs to perform content synchronization; setting a synchronization condition of the buddy device; and saving setting information.

Figure 6:
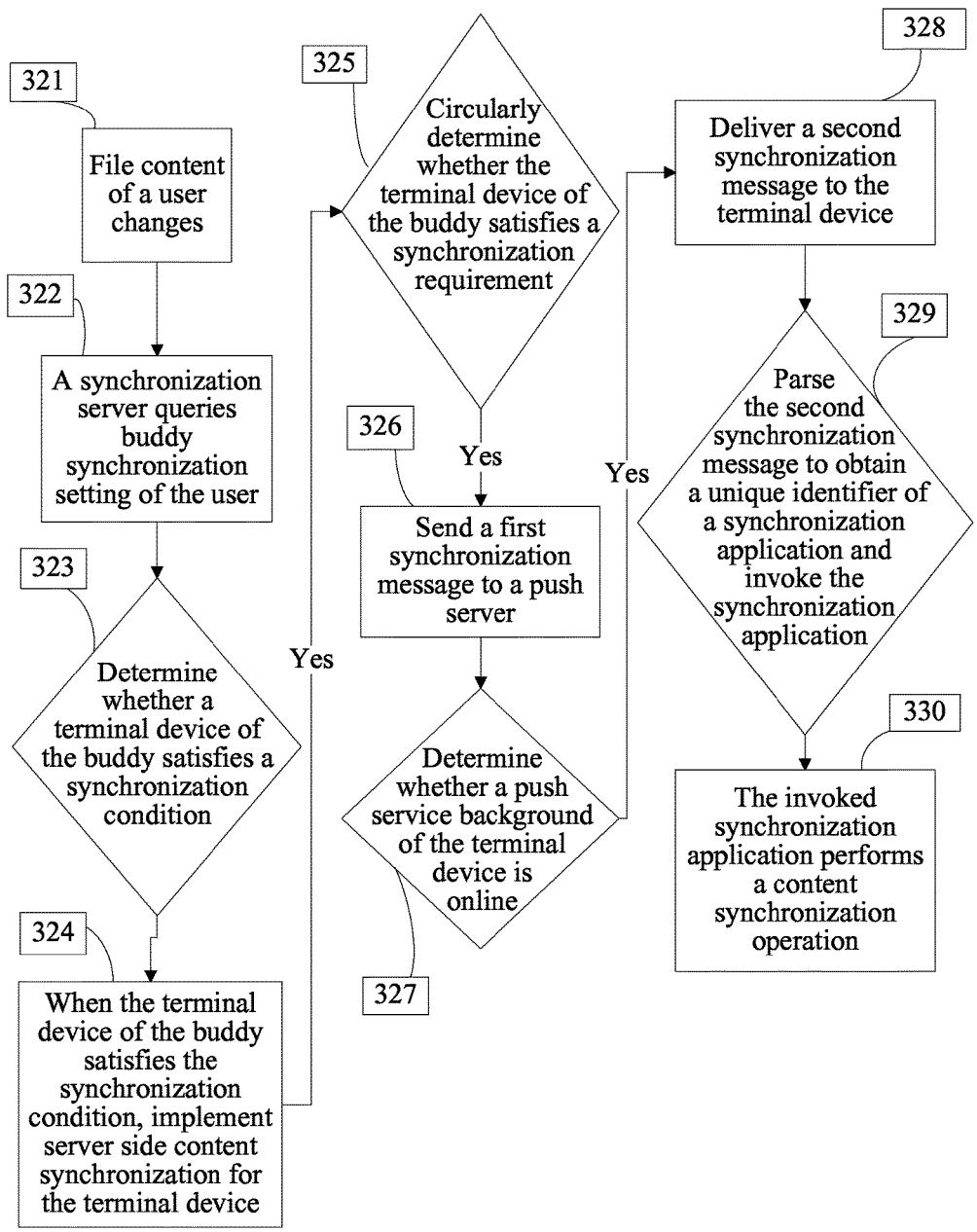
FIG. 6 is a specific flowchart of a method for synchronizing content according to an embodiment of the present invention.

After the setting of the buddy content synchronization condition is complete, content synchronization may be performed. Referring to FIG. 6, the method for synchronizing content provided in this embodiment may include the following steps:

Step 321: File content of a user changes.

Step 322: A synchronization server checks buddy synchronization setting of the user.

Step 323: Determine, according to the buddy synchronization setting, whether a terminal device of a buddy satisfies a synchronization condition. If there are multiple terminal devices of the buddy, it is only required that one terminal device satisfies the condition.

Step 324: When the terminal device of the buddy satisfies the synchronization condition, the synchronization server copies the changed file content to a buddy directory, and completes server side content synchronization for the terminal device.

Step 325: Circularly determine whether the terminal device of the buddy satisfies a synchronization requirement.

For step 326 to step 330, refer to step 105 to step 109 in Embodiment 1.

In the method for synchronizing content provided in the embodiment of the present invention, a synchronization server determines a terminal device that needs to perform content synchronization, and sends a first synchronization message to a push server, where the first synchronization message includes an ID of the terminal device that needs to perform content synchronization, a unique identifier of a synchronization application, a command word, and auxiliary information. In this way, after receiving the first synchronization message, the push server can send a second synchronization message to a corresponding terminal device according to the ID of the terminal device that needs to perform content synchronization, where the second synchronization message includes the unique identifier of the synchronization application, the command word, and the auxiliary information, and then the corresponding terminal device can perform content synchronization according to the command word and the auxiliary information. In the technical solution, the synchronization server actively initiates content synchronization, and the terminal device does not need to initiate a connection and keep requesting, in a polling manner, from a server whether content is updated, thereby reducing the load of the terminal device and improving the processing efficiency.

Embodiment 4

In this embodiment, a user performs an operation on a terminal, obtains a buddy from a cloud synchronization server, then obtains a device of the buddy, and directly performs content synchronization on a specified buddy device.

Figure 7:
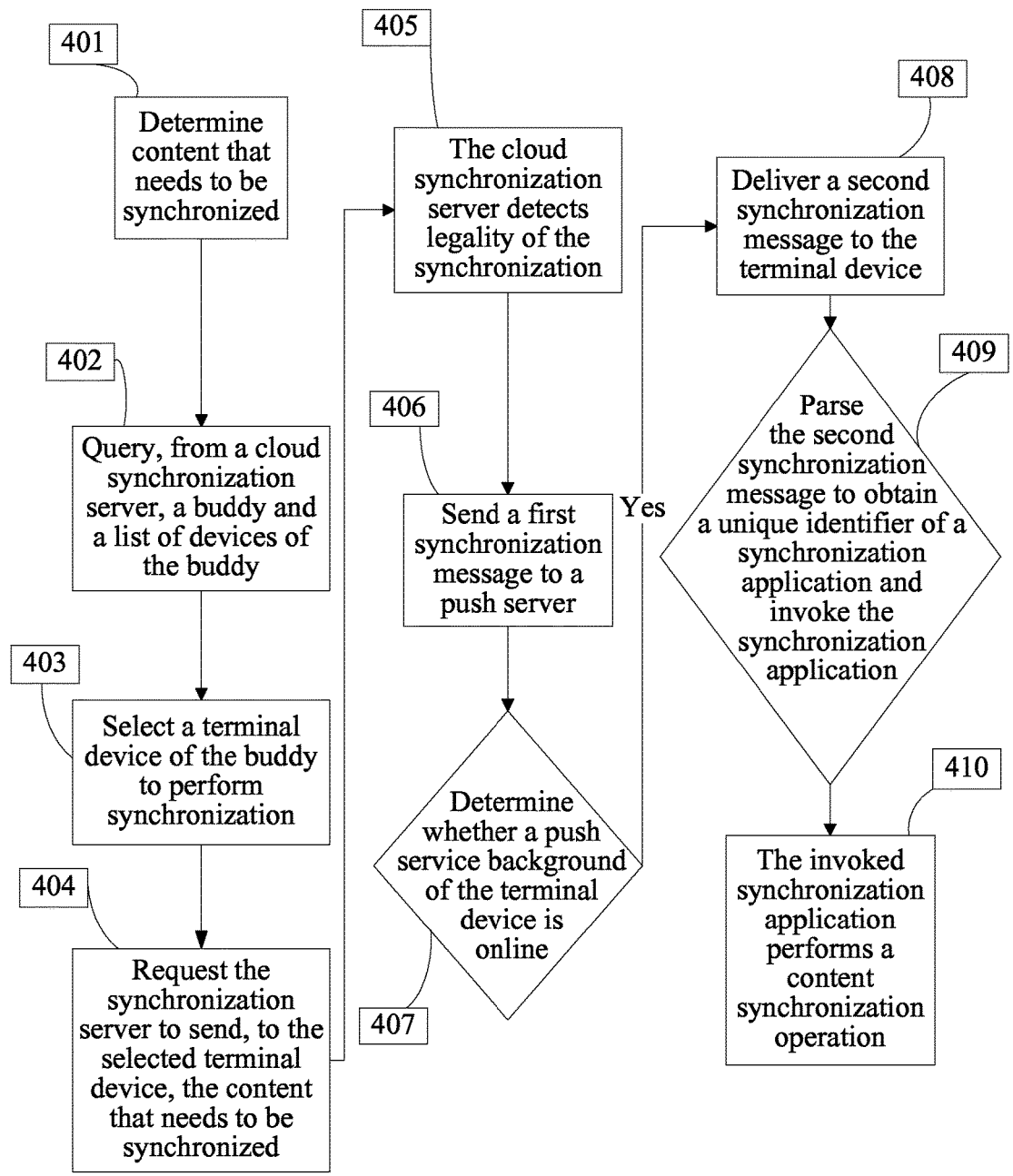
FIG. 7 is a specific flowchart of a method for synchronizing content according to an embodiment of the present invention.

Referring to FIG. 7, the method for synchronizing content provided in this embodiment may include:

Step 401: Determine content that needs to be synchronized. The user may select content in a terminal device of the user to perform synchronization.

Step 402: The terminal device of the user queries, from a synchronization server, a buddy of the user and a list of devices associated with the buddy.

Step 403: Select a terminal device of the buddy to perform synchronization.

Step 404: Request the synchronization server to send, to the selected terminal device, the content that needs to be synchronized.

Step 405: A cloud synchronization server checks legality of the synchronization.

Step 406: When determining that a terminal device that needs to perform content synchronization exists, the synchronization server queries a unique identifier of the terminal device which is reported by the terminal device to the synchronization server and a corresponding unique identifier of a synchronization application, to generate a first synchronization message, where the first synchronization message includes the unique identifier of the synchronization application, the unique identifier of the terminal device, a command word, and auxiliary information, where the command word is used to indicate a synchronization operation that needs to be performed by the terminal device that needs to perform content synchronization, the auxiliary information includes a necessary parameter for implementing the synchronization operation, and the auxiliary information may specifically be metadata information of a file (such as a file name and a path); and sends the first synchronization message to a cloud push server through an interface.

Step 407: The cloud push server parses the first synchronization message to obtain the unique identifier of the terminal device, and queries, according to the unique identifier of the terminal device, whether a push service background of the terminal device is online.

Step 408: If the push service background of the terminal device is online, the push server pushes a second synchronization message to the push service background of the terminal, where the second synchronization message includes the unique identifier of the synchronization application, the command word, and the auxiliary information.

Step 409: After receiving the synchronization message, the push service background of the terminal device parses the second synchronization message to obtain a unique identifier of a synchronization application in the second synchronization message, queries information about a registered application, and invokes the synchronization application to perform a specific service operation. A corresponding android (android) intelligent terminal may be invoked in a broadcasting manner.

Step 410: The synchronization application decides different service operations according to the command word, and the auxiliary information that are transmitted by the push service background: if the command word indicates that addition and modification operations are performed, the synchronization application connects to a cloud synchronization server and obtains content to perform the addition and modification operations; and if the command word indicates that a deletion operation is performed, the deletion operation is directly performed on a local file.

In the method for synchronizing content provided in the embodiment of the present invention, a synchronization server determines a terminal device that needs to perform content synchronization, and sends a first synchronization message to a push server, where the first synchronization message includes an ID of the terminal device that needs to perform content synchronization, a unique identifier of a synchronization application, a command word, and auxiliary information. In this way, after receiving the first synchronization message, the push server can send a second synchronization message to a corresponding terminal device according to the ID of the terminal device that needs to perform content synchronization, where the second synchronization message includes the unique identifier of the synchronization application, the command word, and the auxiliary information, and then the corresponding terminal device can perform content synchronization according to the command word and the auxiliary information. In the technical solution, the synchronization server actively initiates content synchronization, and the terminal device does not need to initiate a connection and keep requesting, in a polling manner, from a server whether content is updated, thereby reducing the load of the terminal device and improving the processing efficiency.

Figure 8:
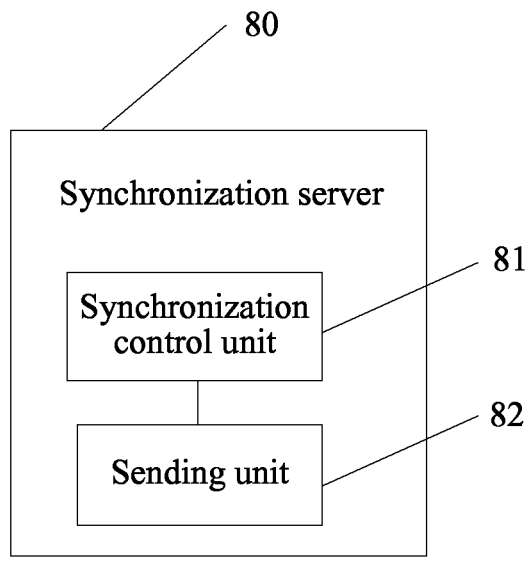
FIG. 8 is a structural block diagram of a synchronization server according to an embodiment of the present invention.

Corresponding to the method shown in FIG. 1, referring to FIG. 8, an embodiment of the present invention further provides a synchronization server 80, where the synchronization server 80 includes a synchronization control unit 81 and a sending unit 82.

The synchronization control unit 81 is configured to determine a terminal device that needs to perform content synchronization; and configured to determine a unique identifier of the terminal device that needs to perform content synchronization and a unique identifier of a synchronization application.

The synchronization control unit 81 may determine, according to a requirement and in the following manner, a terminal device that needs to perform content synchronization.

Optionally, the synchronization control unit 81 is specifically configured to: determine a user corresponding to a terminal device that initiates a synchronization operation; determine all terminal devices associated with the user; and determine that a terminal device, which satisfies a preset content synchronization condition, of all terminal devices associated with the user is the terminal device that needs to perform content synchronization.

Optionally, the synchronization control unit is specifically configured to: determine a user corresponding to a terminal device that initiates a synchronization operation; determine a buddy of the user; determine all terminal devices associated with the buddy; and determine that a terminal device, which satisfies a preset content synchronization condition, of all terminal devices associated with the buddy is the terminal device that needs to perform content synchronization.

Optionally, the synchronization control unit is specifically configured to: determine a user corresponding to a terminal device that initiates a synchronization operation; determine terminal devices which perform content synchronization, which are specified by the user; and determine that a terminal device, which satisfies a preset content synchronization condition, of the specified terminal devices which perform content synchronization is the terminal device that needs to perform content synchronization.

The sending unit 82 is configured to send a synchronization message to a push server, where the synchronization message includes a unique identifier of the terminal device that needs to perform content synchronization, a unique identifier of a synchronization application, a command word, and auxiliary information, so that the push server pushes the synchronization message to the terminal device.

The command word is used to indicate a synchronization operation that needs to be performed by the terminal device that needs to perform content synchronization, and the auxiliary information includes a necessary parameter for implementing the synchronization operation.

Optionally, in an embodiment of the present invention, the synchronization server further includes a receiving unit, where the receiving unit is configured to receive registration information sent by the terminal device, and the registration information includes a unique identifier of the terminal device and a unique identifier of a synchronization application.

The synchronization control unit 81 is specifically configured to determine, according to the registration information, received by the receiving unit, of the terminal device that needs to perform content synchronization, the unique identifier of the terminal device that needs to perform content synchronization and the unique identifier of the synchronization application.

In the synchronization server provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

Figure 9:
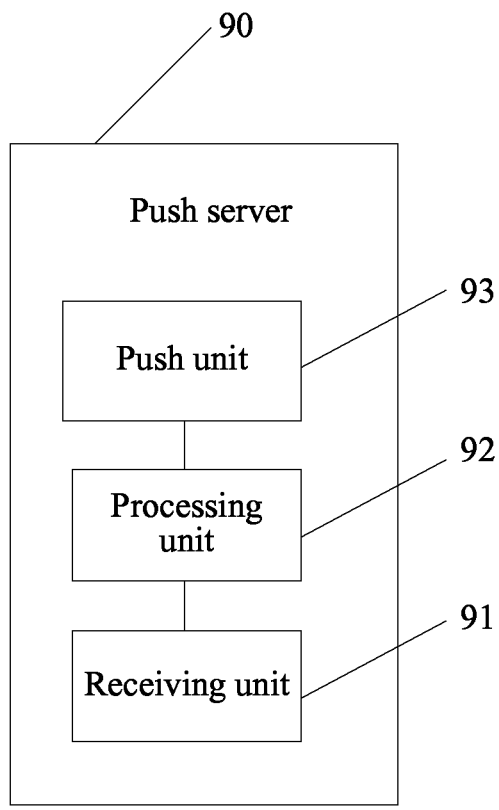
FIG. 9 is a structural block diagram of a push server according to an embodiment of the present invention.

Corresponding to the method shown in FIG. 2, referring to FIG. 9, an embodiment of the present invention further provides a push server 90, where the push server 90 includes a receiving unit 91, a processing unit 92 and a push unit 93, where:

the receiving unit 91 is configured to receive a synchronization message sent by a synchronization server, where the synchronization message includes a unique identifier of a terminal device that needs to perform content synchronization, a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

the processing unit 92 is configured to parse the synchronization message received by the receiving unit 91, to obtain a unique identifier of the terminal device that needs to perform content synchronization; and determine, according to the unique identifier of the terminal device that needs to perform content synchronization, whether the terminal device that needs to perform content synchronization is online; and the push unit 93 is configured to send, when the processing unit 92 determines that the terminal device that needs to perform content synchronization is online, the synchronization message to the terminal device that needs to perform content synchronization.

Optionally, in an embodiment of the present invention, the receiving unit 91 is further configured to receive registration information sent by the terminal device, where the registration information includes the unique identifier of the terminal device and the unique identifier of a synchronization application.

The processing unit 92 is further configured to generate the unique identifier of the synchronization application according to the registration information received by the receiving unit 91.

The push unit 93 is further configured to send the unique identifier of the synchronization application to the terminal device.

In the push server provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

Figure 10:
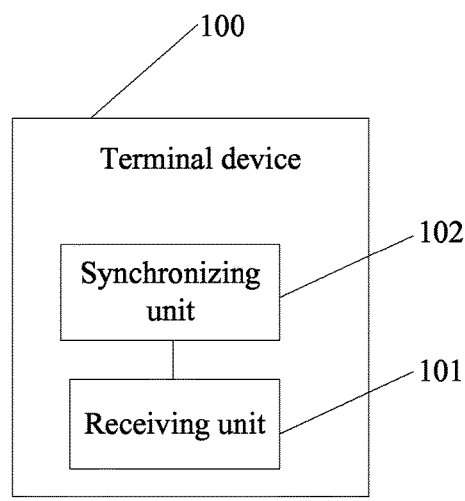
FIG. 10 is a structural block diagram of a terminal device according to an embodiment of the present invention.

Corresponding to the method shown in FIG. 3, referring to FIG. 10, an embodiment of the present invention further provides a terminal device 100, where the terminal device 100 may include a receiving unit 101 and a synchronizing unit 102, where:

the receiving unit 101 is configured to receive a synchronization message sent by a push server, where the synchronization message includes a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation; and the synchronizing unit 102 is configured to perform a synchronization operation according to the unique identifier of the synchronization application, the command word, and the auxiliary information that are received by the receiving unit, where the synchronization operation includes a deletion operation.

Optionally, in an embodiment of the present invention, the synchronization operation may further include an addition operation and a modification operation, and the synchronizing unit 102 may further be configured to connect to the synchronization server and obtain synchronization content, so as to perform the addition operation and/or the modification operation.

Optionally, in an embodiment of the present invention, the terminal device may further include:

a sending unit, configured to send first registration information to the push server, where the first registration information includes a unique identifier of the terminal device and a synchronization application name, where the receiving unit is further configured to receive the unique identifier of the synchronization application sent by the push server, where the unique identifier of the synchronization application is generated by the push server according to the unique identifier of the terminal device and the synchronization application name; and the sending unit is further configured to send second registration information to the synchronization server, where the second registration information includes the unique identifier of the terminal device and the unique identifier of the synchronization application.

In the method for synchronizing content provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

It should be noted that, units included in the foregoing embodiments of the synchronization server, the push server and the terminal device are merely divided according to functional logic, which are not limited to the foregoing divisions as long as corresponding functions can be implemented. In addition, specific names of functional units are also merely for ease of distinguishing each other, and are not intended to limit the protection scope of the present invention.

In addition, an embodiment of the present invention further provides a network system, where the network system includes a synchronization server, a terminal device, and a push server, where:

the synchronization server is configured to determine a terminal device that needs to perform content synchronization; determine a unique identifier of the terminal device that needs to perform content synchronization and a unique identifier of a synchronization application; and send a first synchronization message to the push server, where the first synchronization message includes the unique identifier of the terminal device that needs to perform content synchronization, the unique identifier of the synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

the push server is configured to receive the first synchronization message sent by the synchronization server; parse the first synchronization message to obtain the unique identifier of the terminal device that needs to perform content synchronization; determine, according to the unique identifier of the terminal device that needs to perform content synchronization, whether the terminal device that needs to perform content synchronization is online; and send, when the terminal device that needs to perform content synchronization is online, a second synchronization message to the terminal device that needs to perform content synchronization, where the second synchronization message includes the unique identifier of the synchronization application, the command word, and the auxiliary information; and the terminal device is configured to receive the second synchronization message sent by the push server; and perform a synchronization operation according to the unique identifier of the synchronization application, the command word, and the auxiliary information that are included in the second synchronization message, where the synchronization operation includes a deletion operation.

Optionally, in another embodiment of the present invention, the terminal device is further configured to send first registration information to the push server before the synchronization server determines the terminal device that needs to perform content synchronization, where the first registration information includes a unique identifier of the terminal device and a synchronization application name;

the push server is further configured to receive the first registration information sent by the terminal device; and generate the unique identifier of the synchronization application according to the first registration information and send the unique identifier of the synchronization application to the terminal device;

the terminal device is further configured to receive the unique identifier of the synchronization application; and send second registration information to the synchronization server, where the second registration information includes the unique identifier of the terminal device and the unique identifier of the synchronization application; and the synchronization server is further configured to receive the second registration information sent by the terminal device.

It should be noted that, a synchronization server in a network system embodiment of the present invention may be any synchronization server provided in foregoing embodiments of the present invention, a push server in the network system embodiment of the present invention may be any push server provided in the foregoing embodiments of the present invention, and a terminal device in the network system embodiment of the present invention may be any terminal device provided in the foregoing embodiments of the present invention, which have been described in the foregoing in detail and therefore are not described again herein.

In the network system provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

Figure 11:
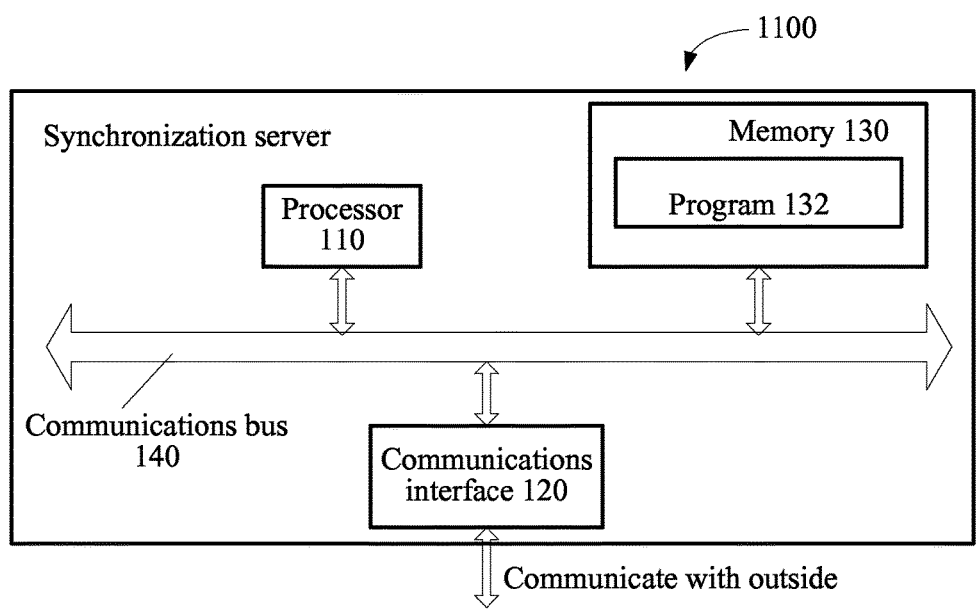
FIG. 11 is a schematic diagram of a synchronization server according to an embodiment of the present invention.

Referring to FIG. 11, an embodiment of the present invention provides a schematic diagram of a synchronization server 1100. The embodiment of the present invention does not limit specific implementation of a computing node. As shown in FIG. 11, the synchronization server provided in the embodiment of the present invention includes a processor (processor) 110, a communications interface (Communications Interface) 120, a memory (memory) 130, and a bus 140.

The processor 110, the communications interface 120, and the memory 130 implement communication between each other through the bus 140.

The communications interface 120 is configured to communicate with an external terminal device or a push server.

The processor 110 is configured to execute a program 132.

Specifically, the program 132 may include program code, where the program code includes a computer operation instruction.

The processor 110 may be a central processing unit CPU, or an application specific integrated circuit ASIC (Application Specific Integrated Circuit), or one or more integrated circuits that are configured to implement the embodiment of the present invention.

The memory 130 is configured to store the program 132. The memory 130 may include a high-speed RAM memory, and may further include a non-volatile memory (non-volatile memory), for example, at least one disk memory. The program 132 may specifically include:

a synchronization control unit 81, configured to determine a terminal device that needs to perform content synchronization; and configured to determine a unique identifier of the terminal device that needs to perform content synchronization and a unique identifier of a synchronization application.

The synchronization control unit 81 may determine, according to a requirement and in the following manner, a terminal device that needs to perform content synchronization.

Optionally, the synchronization control unit 81 is specifically configured to: determine a user corresponding to a terminal device that initiates a synchronization operation; determine all terminal devices associated with the user; and determine a terminal device, which satisfies a preset content synchronization condition, of all terminal devices associated with the user is the terminal device that needs to perform content synchronization.

Optionally, the synchronization control unit is specifically configured to: determine a user corresponding to a terminal device that initiates a synchronization operation; determine a buddy of the user; determine all terminal devices associated with the buddy; and determine that a terminal device, which satisfies a preset content synchronization condition, of all terminal devices associated with the buddy is the terminal device that needs to perform content synchronization.

Optionally, the synchronization control unit is specifically configured to: determine a user corresponding to a terminal device that initiates a synchronization operation; determine terminal devices which perform content synchronization, which are specified by the user; and determine that a terminal device, which satisfies a preset content synchronization condition, of the specified terminal devices which perform content synchronization is the terminal device that needs to perform content synchronization.

The sending unit 82 is configured to send a synchronization message to a push server, where the synchronization message includes a unique identifier of the terminal device that needs to perform content synchronization, a unique identifier of a synchronization application, a command word, and auxiliary information, so that the push server pushes the synchronization message to the terminal device.

The command word is used to indicate a synchronization operation that needs to be performed by the terminal device that needs to perform content synchronization, and the auxiliary information includes a necessary parameter for implementing the synchronization operation.

Optionally, in an embodiment of the present invention, the synchronization server further includes a receiving unit, where the receiving unit is configured to receive registration information sent by the terminal device, and the registration information includes a unique identifier of the terminal device and a unique identifier of a synchronization application.

The synchronization control unit 81 is specifically configured to determine, according to the registration information, received by the receiving unit, of the terminal device that needs to perform content synchronization, the unique identifier of the terminal device that needs to perform content synchronization and the unique identifier of the synchronization application.

In the synchronization server provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

Figure 12:
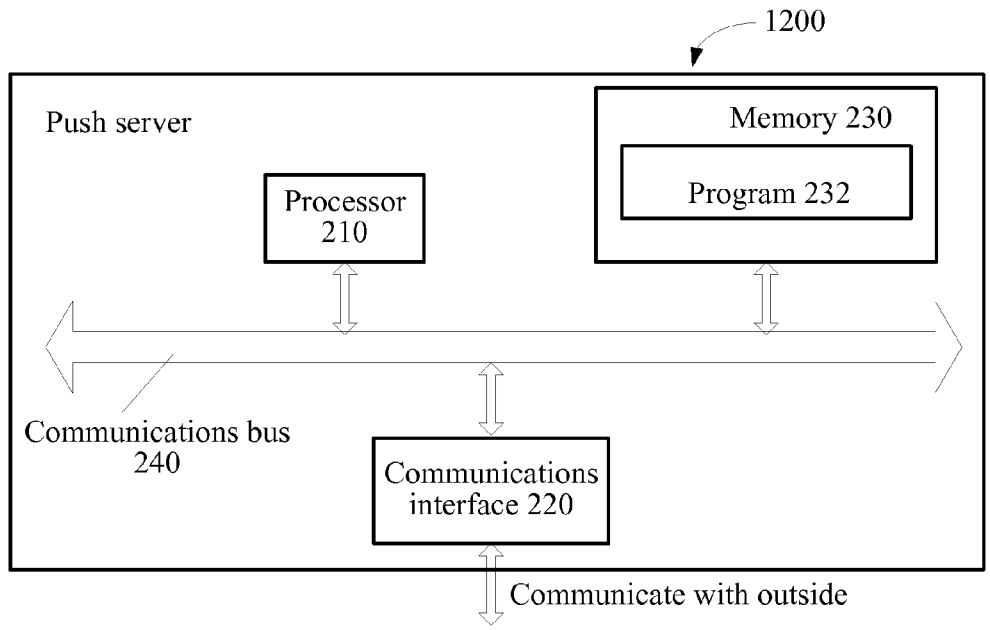
FIG. 12 is a schematic diagram of a push server according to an embodiment of the present invention.

Referring to FIG. 12, an embodiment of the present invention provides a schematic diagram of a push server 1200. The embodiment of the present invention does not limit specific implementation of a computing node. As shown in FIG. 12, the push server provided in the embodiment of the present invention includes a processor (processor) 210, a communications interface (Communications Interface) 220, a memory (memory) 230, and a bus 240.

The processor 210, the communications interface 220 and the memory 230 implement communication between each other through the bus 240.

The communications interface 220 is configured to communicate with an external terminal device or a push server.

The processor 210 is configured to execute a program 232.

Specifically, the program 232 may include program code, where the program code includes a computer operation instruction.

The processor 210 may be a central processing unit CPU, or an application specific integrated circuit ASIC (Application Specific Integrated Circuit), or one or more integrated circuits that are configured to implement the embodiment of the present invention.

The memory 230 is configured to store the program 232. The memory 230 may include a high-speed RAM memory, and may further include a non-volatile memory (non-volatile memory), for example, at least one disk memory. The program 232 may specifically include:

a receiving unit 91, configured to receive a synchronization message sent by a synchronization server, where the synchronization message includes a unique identifier of a terminal device that needs to perform content synchronization, a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation;

a processing unit 92, configured to parse the synchronization message received by the receiving unit 91, to obtain a unique identifier of the terminal device that needs to perform content synchronization; and determine, according to the unique identifier of the terminal device that needs to perform content synchronization, whether the terminal device that needs to perform content synchronization is online; and a push unit 93, configured to send, when the terminal device that needs to perform content synchronization is online, the synchronization message to the terminal device that needs to perform content synchronization.

Optionally, in an embodiment of the present invention, the receiving unit 91 is further configured to receive registration information sent by the terminal device, where the registration information includes the unique identifier of the terminal device and a unique identifier of a synchronization application.

The processing unit 92 is further configured to generate the unique identifier of the synchronization application according to the registration information received by the receiving unit 91.

The push unit 93 is further configured to send the unique identifier of the synchronization application to the terminal device.

In the push server provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

Figure 13:
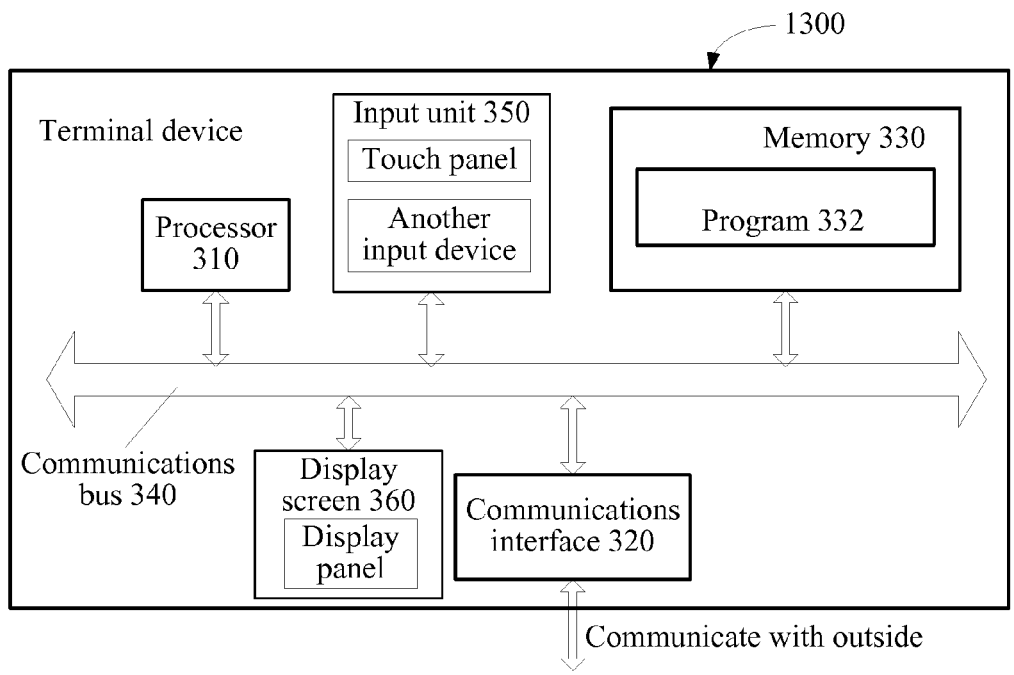
FIG. 13 is a schematic diagram of a terminal device according to an embodiment of the present invention.

FIG. 13 shows a structure of a terminal device provided in an embodiment of the present invention. The terminal may include a terminal device such as a mobile phone, a tablet computer, a PDA (Personal Digital Assistant, personal digital Assistant), a POS (Point of Sales, point of sales) or a vehicle-mounted computer. As shown in FIG. 13, the terminal device includes:

a processor 310, a communications interface 320, a memory 330, an input unit 350, and a display unit 360, which implement communication between each other through a bus 340.

The memory 330 may be configured to store a software program, and the processor 310 executes various function applications and data processing of the terminal device 1300 by running the software program stored in the memory 330. The memory 330 may mainly include a program storage area and a data storage area, where the program storage area may store an operating system, an application required by at least one function (such as a sound play function and an image play function), and the like; and the data storage area may store data created according to the use of the terminal device 1300 (such as audio data and a phone book) and the like. In addition, the memory 330 may include a high-speed random access memory, and may also include a non-volatile memory, for example, at least one disk storage device, a flash memory device, or other volatile solid-state storage devices.

The input unit 350 may be configured to receive digit or character information input by a user, and generate a key signal input related to user setting and function control of the terminal device 1300. Specifically, the input unit 350 may include a touch panel and another input device. A touch panel, also referred to as a touchscreen, may collect touch operations of the user on the touch panel or near the touch panel (for example, an operation of the user on the touch panel or near the touch panel by using any proper object or attachment such as a finger or a stylus), and drive a corresponding connecting apparatus according to a preset program. Optionally, the touch panel may include two parts: a touch detection apparatus and a touch controller. The touch detection apparatus detects a touch direction of the user, detects a signal brought about by the touch operation and transmits the signal to the touch controller. The touch controller receives touch information from the touch detection apparatus, converts the touch information into contact coordinates, and then sends the contact coordinates to the processor 310, and can receive a command sent from the processor 310 and execute the command. In addition, the touch panel may be implemented in various types, such as resistance-type, capacitance-type, infrared and surface acoustic wave. Besides the touch panel, the input unit 350 may further include another input device. Specifically, the another input device may include but is not limited to one or more of a physical keyboard, a function key (such as a volume control key or a switch key), a trackball, a mouse, and an operating lever.

The display unit 360 may be configured to display information input by the user or information provided for the user, and various menus of the terminal device. The display unit 360 may include a display panel, and optionally, the display panel may be configured in a form of an LCD (Liquid Crystal Display, liquid crystal display), an OLED (Organic Light-Emitting Diode, organic light-emitting diode), or the like. Further, the touch panel may cover the display panel, and when detecting a touch operation on the touch panel or near the touch panel, the touch panel transmits the touch operation to the processor 310 to determine a type of a touch event, and subsequently, the processor 310 provides a corresponding visual output on the display panel according to the type of the touch event. In FIG. 13, the touch panel and the display panel are used as two independent components to implement input and output functions of the terminal device 1300, but in some embodiments, the touch panel and the display panel may be integrated to implement the input and output functions of the terminal device 1300.

The communications interface 320 is configured to communicate with an external terminal device or a synchronization server.

The processor 310 is configured to execute a program 332.

Specifically, the program 332 may include program code, where the program code includes a computer operation instruction.

The processor 310 may be a central processing unit CPU, or an application specific integrated circuit ASIC (Application Specific Integrated Circuit), or one or more integrated circuits that are configured to implement the embodiment of the present invention.

The memory 330 is configured to store the program 332. The memory 330 may include a high-speed RAM memory, and may further include a non-volatile memory (non-volatile memory), for example, at least one disk memory. The program 332 may specifically include:

a receiving unit 101, configured to receive a synchronization message sent by a push server, where the synchronization message includes a unique identifier of a synchronization application, a command word, and auxiliary information, where the command word is used to indicate a synchronization operation that needs to be performed by the terminal device that needs to perform content synchronization, and the auxiliary information includes a necessary parameter for implementing the synchronization operation; and a synchronizing unit 102, configured to perform a synchronization operation according to the unique identifier of the synchronization application, the command word, and the auxiliary information that are received by the receiving unit, where the synchronization operation includes a deletion operation.

Optionally, in an embodiment of the present invention, the synchronization operation may further include an addition operation and a modification operation, and the synchronizing unit 102 may further be configured to connect to the synchronization server and obtain synchronization content, so as to perform the addition operation and/or the modification operation.

Optionally, in an embodiment of the present invention, the program 332 in the memory 330 of the terminal device may further include:

a sending unit, configured to send first registration information to the push server, where the first registration information includes a unique identifier of the terminal device and a synchronization application name, where the receiving unit is further configured to receive the unique identifier of the synchronization application sent by the push server, where the unique identifier of the synchronization application is generated by the push server according to the unique identifier of the terminal device and the synchronization application name; and the sending unit is further configured to send second registration information to the synchronization server, where the second registration information includes the unique identifier of the terminal device and the unique identifier of the synchronization application.

In the terminal device provided in the embodiment of the present invention, a synchronization server determines a terminal device that needs to perform content synchronization, and sends a synchronization message to a push server, where the synchronization message includes a unique identifier of the terminal device that needs to perform content synchronization, a unique identifier of a synchronization application, a command word, and auxiliary information. In this way, after receiving the synchronization message, the push server can send the synchronization message to a corresponding terminal device according to the unique identifier of the terminal device that needs to perform content synchronization, and then the corresponding terminal device performs content synchronization. In the technical solution of the present invention, the synchronization server actively initiates content synchronization, and the terminal device does not need to initiate a connection and keep requesting, in a polling manner, from a server whether content is updated, thereby reducing the load of the terminal device and improving the processing efficiency.

A person of ordinary skill in the art may understand that all or a part of the steps of the methods in the embodiments may be implemented by a program instructing relevant hardware. The program may be stored in a computer readable storage medium. The storage medium may include: a read-only memory, a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for synchronizing content, wherein the method comprises:

determining, by a synchronization server, a terminal device associated with a user, among terminal devices associated with the user, needs to perform file content synchronization of a file content, in response to a determination of a change including addition, deletion and/or modification in connection with the file content, the terminal device including a synchronization application invocable to perform the file content synchronization and registered by a first registration at least with a push server;

determining initiation of a synchronization operation for the terminal device, in response to receiving, by the synchronization server from the terminal device, second registration information including a unique identifier of the terminal device and a unique identifier of the synchronization application generated by the push server to perform a second registration of the synchronization application with the synchronization server, the synchronization operation to cause determining, by the synchronization server, whether the terminal device needs to perform a file content synchronization according to the second registration information including the unique identifier of the terminal device and the unique identifier of the synchronization application; and in response to a determining that the terminal device needs to perform the file content synchronization, sending, by the synchronization server, a first synchronization message to the push server, wherein the first synchronization message comprises the unique identifier of the terminal device that needs to perform the file content synchronization, the unique identifier of the synchronization application, a command word for the synchronization application, and auxiliary information, the first synchronization message to control the push server to send a second synchronization message including the command word to the terminal device to cause invoking by the terminal device, in response to the command word, the synchronization application registered with the push server, to perform a synchronization operation for the file content synchronization, and the auxiliary information comprises a parameter for implementing the synchronization operation, wherein to perform the first registration of the synchronization application with the push server, before the receiving, by the terminal device, the second synchronization message sent by the push server, sending, by the terminal device, first registration information to the push server, wherein the first registration information comprises a unique identifier of the terminal device and a synchronization application name, and receiving, by the terminal device, the unique identifier of the synchronization application sent by the push server, wherein the unique identifier of the synchronization application is generated by the push server according to the unique identifier of the terminal device and the synchronization application name; and wherein to perform the second registration of the synchronization application, sending, by the terminal device, the second registration information to the synchronization server, wherein the second registration information comprises the unique identifier of the terminal device and the unique identifier of the synchronization application generated by the push server.

2. The method according to claim 1, wherein the determining, by a synchronization server, a terminal device that needs to perform file content synchronization comprises:

determining, by the synchronization server, a user associated with a terminal device, among terminal devices associated with the user, that triggers a synchronization operation;

determining, by the synchronization server, the terminal devices associated with the user; and determining, by the synchronization server, that a terminal device, which satisfies a set file content synchronization condition, of the terminal devices associated with the user is the terminal device that needs to perform file content synchronization;

or, the determining, by a synchronization server, a terminal device that needs to perform file content synchronization comprises:

determining, by the synchronization server, a user associated with a terminal device, among terminal devices associated with the user, that triggers a synchronization operation;

determining, by the synchronization server, a buddy of the user;

determining, by the synchronization server, the terminal devices associated with the buddy; and determining, by the synchronization server, that a terminal device, which satisfies a set file content synchronization condition, of the terminal devices associated with the buddy is the terminal device that needs to perform file content synchronization;

or, the determining, by a synchronization server, a terminal device that needs to perform file content synchronization comprises:

determining, by the synchronization server, a user associated with a terminal device, among terminal devices associated with the user, that triggers a synchronization operation;

determining, by the synchronization server, terminal devices specified by the user, among the terminal devices associated with the user, which perform file content synchronization; and determining, by the synchronization server, that a terminal device, which satisfies a set file content synchronization condition, of the specified terminal devices which perform file content synchronization is the terminal device that needs to perform file content synchronization.

3. A method for synchronizing content, wherein the method comprises:

receiving, by a terminal device associated with a user, among terminal devices associated with the user, a second synchronization message sent by a push server, wherein the second synchronization message is sent by the push server in response to a first synchronization message sent by a synchronization server with which the terminal device has registered by a second registration a unique identifier of the terminal device and a unique identifier of a synchronization application invocable to perform the file content synchronization and registered by a first registration at least with the push server, wherein the second synchronization message comprises the unique identifier of the synchronization application registered by a first registration at least with the push server, a command word for the synchronization application, and auxiliary information, wherein the command word is used to indicate a synchronization operation that needs to be performed in response to receiving, by the synchronization server from the terminal device, registration information including the unique identifier of the terminal device and the unique identifier of the synchronization application to perform a second registration of the synchronization application and a determination by the synchronization server that the terminal device needs to perform file content synchronization of a file content, in response to a determination of a change including addition, deletion and/or modification in connection with the file content, and the auxiliary information comprises a parameter for implementing the synchronization operation; and invoking, by the terminal device, the synchronization application to perform the synchronization operation, according to the unique identifier of the synchronization application, the command word, and the auxiliary information, wherein to first register the synchronization application with the at least the push server, before the receiving, by a terminal device, a second synchronization message sent by a push server, sending, by the terminal device, first registration information to the push server, wherein the first registration information comprises a unique identifier of the terminal device and a synchronization application name, and receiving, by the terminal device, the unique identifier of the synchronization application sent by the push server, wherein the unique identifier of the synchronization application is generated by the push server according to the unique identifier of the terminal device and the synchronization application name; and wherein to second register the synchronization application, sending, by the terminal device, second registration information to a synchronization server, wherein the second registration information comprises the unique identifier of the terminal device and the unique identifier of the synchronization application.

4. The method according to claim 3, wherein the synchronization operation comprises the addition, deletion and/or modification in connection with the file content, and the method further comprises:

connecting, by the terminal device, to the synchronization server and obtaining synchronization file content, so as to perform the addition, deletion and/or modification in connection with the file content.

5. A method for synchronizing content, wherein the method comprises:
receiving, by a push server, a first synchronization message sent by a synchronization server, wherein the first synchronization message comprises,
a unique identifier of a terminal device associated with a user, among terminal devices associated with the user, that needs to perform content synchronization,
a unique identifier of a synchronization application of the terminal device, the synchronization application invocable to perform the file content synchronization and registered by a first registration at least with the push server,
a command word for the synchronization application, and
auxiliary information,
the command word is used to indicate a synchronization operation that needs to be performed in response to receiving, by the synchronization server from the terminal device, registration information including the unique identifier of the terminal device and the unique identifier of the synchronization application to perform a second registration of the synchronization application and a determination by the synchronization server that the terminal device needs to perform file content synchronization of a file content, in response to a determination of a change including addition, deletion and/or modification in connection with the file content, and the auxiliary information comprises a parameter for implementing the synchronization operation;
parsing, by the push server, the first synchronization message to obtain the unique identifier of the terminal device that needs to perform file content synchronization;
determining, by the push server, according to the unique identifier of the terminal device that needs to perform content synchronization, whether the terminal device that needs to perform file content synchronization is online; and
sending, by the push server when the terminal device that needs to perform file content synchronization is online, a second synchronization message including the command word to the terminal device that needs to perform file content synchronization, to cause, invoking by the terminal device, in response to the command word, the synchronization application registered with the push server, to perform the synchronization operation for the file content synchronization,
wherein to first register the synchronization application with the at least the push server, before the receiving, by a push server, a first synchronization message sent by a synchronization server,
receiving, by the push server, registration information sent by the terminal device, wherein the registration information comprises the unique identifier of the terminal device and a synchronization application name; and
generating, by the push server, the unique identifier of the synchronization application according to the registration information, and sending the unique identifier of the synchronization application to the terminal device.

6. A method for synchronizing content, wherein the method comprises:
determining, by a synchronization server, a terminal device associated with a user, among terminal devices associated with the user, needs to perform file content synchronization of a file content, in response to a determination of a change including addition, deletion and/or modification in connection with the file content, the terminal device including a synchronization application invocable to perform the file content synchronization and registered by a first registration at least with a push server;
determining initiation of a synchronization operation for the terminal device, in response to receiving, by the synchronization server from the terminal device, second registration information including a unique identifier of the terminal device and a unique identifier of the synchronization application generated by the push server to perform a second registration of the synchronization application with the synchronization server, the synchronization operation to cause determining, by the synchronization server, whether the terminal device needs to perform a file content synchronization according to the second registration information including the unique identifier of the terminal device and the unique identifier of a synchronization application;
in response to a determining that the terminal device needs to perform the file content synchronization, sending, by the synchronization server, a first synchronization message to the push server, wherein the first synchronization message comprises the unique identifier of the terminal device that needs to perform the file content synchronization, the unique identifier of the synchronization application, a command word for the synchronization application, and auxiliary information,
wherein the command word is used to indicate a synchronization operation that needs to be performed by the terminal device that needs to perform the file content synchronization, and the auxiliary information comprises a parameter for implementing the synchronization operation;
receiving, by the push server, the first synchronization message sent by the synchronization server;
parsing, by the push server, the first synchronization message to obtain the unique identifier of the terminal device that needs to perform the file content synchronization;
determining, by the push server according to the unique identifier of the terminal device that needs to perform the file content synchronization, whether the terminal device that needs to perform the file content synchronization is online;
sending, by the push server when the terminal device that needs to perform the file content synchronization is online, a second synchronization message to the terminal device that needs to perform the file content synchronization, wherein the second synchronization message comprises the unique identifier of the synchronization application, the command word, and the auxiliary information;
receiving, by the terminal device that needs to perform the file content synchronization, the second synchronization message sent by the push server; and
invoking, by the terminal device, the synchronization application to perform the synchronization operation, according to the unique identifier of the synchronization application, the command word, and the auxiliary information that are comprised in the second synchronization message, wherein to first register the synchronization application with the at least the push server, before the determining, by a synchronization server, a terminal device that needs to perform file content synchronization, sending, by the terminal device, first registration information to the push server, wherein the first registration information comprises a unique identifier of the terminal device and a synchronization application name;

receiving, by the push server, the first registration information sent by the terminal device:

generating, by the push server, the unique identifier of the synchronization application according to the first registration information, and sending the unique identifier of the synchronization application to the terminal device;

receiving, by the terminal device, the unique identifier of the synchronization application;

sending, by the terminal device, second registration information to a synchronization server, wherein the second registration information comprises the unique identifier of the terminal device and the unique identifier of the synchronization application; and receiving, by the synchronization server, the second registration information sent by the terminal device.

7. A synchronization server, wherein the synchronization server comprises:

at least one memory; and at least one processor coupled to the at least one memory and to, determine a terminal device associated with a user, among terminal devices associated with the user, needs to perform file content synchronization of a file content, in response to a determination of a change including addition, deletion and/or modification in connection with the file content, the terminal device including a synchronization application invocable to perform the file content synchronization and registered by a first registration at least with a push server, wherein determine initiation of a synchronization operation for the terminal device, in response to receiving, by the synchronization server from the terminal device, second registration information including a unique identifier of the terminal device and a unique identifier of the synchronization application generated by the push server to perform a second registration of the synchronization application with the synchronization server, the synchronization operation to determine whether the terminal device needs to perform a file content synchronization according to the second registration information including the unique identifier of the terminal device and the unique identifier of the synchronization application; and in response to a determining that the terminal device needs to perform the file content synchronization, send a first synchronization message to the push server, wherein the first synchronization message comprises the unique identifier of the terminal device that needs to perform the file content synchronization, the unique identifier of the synchronization application, a command word for the synchronization application, and auxiliary information, the first synchronization message to control the push server to send a second synchronization message including the command word to the terminal device to cause invoking by the terminal device, in response to the command word, the synchronization application registered with the push server to perform a synchronization operation for the file content synchronization, and the auxiliary information comprises a parameter for implementing the synchronization operation, wherein to perform the first registration of the synchronization application with the push server, before the receiving, by the terminal device, the second synchronization message sent by the push server, send, by the terminal device, first registration information to the push server, wherein the first registration information comprises a unique identifier of the terminal device and a synchronization application name, and receive, by the terminal device, the unique identifier of the synchronization application sent by the push server, wherein the unique identifier of the synchronization application is generated by the push server according to the unique identifier of the terminal device and the synchronization application name; and wherein to perform the second registration of the synchronization application, send, by the terminal device, the second registration information to the synchronization server, wherein the second registration information comprises the unique identifier of the terminal device and the unique identifier of the synchronization application generated by the push server.

8. The synchronization server according to claim 7, wherein the at least processor is to:

determine a user associated with a terminal device, among terminal devices associated with the user, that triggers a synchronization operation;

determine the terminal devices associated with the user; and determine that a terminal device, which satisfies a set file content synchronization condition, of the terminal devices associated with the user is the terminal device that needs to perform file content synchronization;

or, the at least one processor is to:

determine a user associated with a terminal device, among terminal devices associated with the user, that triggers a synchronization operation;

determine a buddy of the user;

determine the terminal devices associated with the buddy; and determine that a terminal device, which satisfies a set file content synchronization condition, of the terminal devices associated with the buddy is the terminal device that needs to perform content synchronization;

or, the at least one processor is to:

determine a user associated with a terminal device, among terminal devices associated with the user, that triggers a synchronization operation;

determine terminal devices specified by the user, among the terminal devices associated with the user, which perform file content synchronization, which are specified by the user; and determine that a terminal device, which satisfies a set file content synchronization condition, of the specified terminal devices which perform file content synchronization is the terminal device that needs to perform content synchronization.

9. A terminal device, wherein the terminal device is associated with a user, among terminal devices associated with the user, the terminal device comprises:
at least one memory to store a synchronization application; and
at least one processor coupled to the memory and to,
receive a second synchronization message sent by a push server, wherein the second synchronization message is sent by the push server in response to a first synchronization message sent by a synchronization server with which the terminal device has registered by a second registration a unique identifier of the terminal device and a unique identifier of a synchronization application invocable to perform the file content synchronization and registered by a first registration at least with the push server,
wherein the second synchronization message comprises the unique identifier of the synchronization application registered by a first registration at least with the push server, a command word for the synchronization application, and auxiliary information,
wherein the command word is used to indicate a synchronization operation that needs to be performed in response to receiving, by the synchronization server from the terminal device, registration information including the unique identifier of the terminal device and the unique identifier of the synchronization application to perform a second registration of the synchronization application and a determination by the synchronization server that the terminal device needs to perform file content synchronization of a file content, in response to a determination of a change including addition, deletion and/or modification in connection with the file content, and the auxiliary information comprises a parameter for implementing the synchronization operation; and
invoke the synchronization application to perform the synchronization operation, according to the unique identifier of the synchronization application, the command word, and the auxiliary information that are received by the receiving unit,
wherein the at least one processor is to:
send first registration information to the push server, wherein the first registration information comprises a unique identifier of the terminal device and a synchronization application name,
receive the unique identifier of the synchronization application sent by the push server, wherein the unique identifier of the synchronization application is generated by the push server according to the unique identifier of the terminal device and the synchronization application name; and
send second registration information to a synchronization server, wherein the second registration information comprises the unique identifier of the terminal device and the unique identifier of the synchronization application.

10. The terminal device according to claim 9, wherein the synchronization operation comprises the addition, deletion and/or modification in connection with the file content, and the at least one processor is to connect to the synchronization server and obtain synchronization file content, so as to perform the addition, deletion and/or modification in connection with the file content.

11. A push server, wherein the push server comprises:
at least one memory; and
at least one processor coupled to the at least one memory and to,
receive a first synchronization message sent by a synchronization server, wherein the first synchronization message comprises,
a unique identifier of a terminal device associated with a user, among terminal devices associated with the user, that needs to perform content synchronization,
a unique identifier of a synchronization application of the terminal device, the synchronization application invocable to perform the file content synchronization and registered by a first registration at least with the push server,
a command word for the synchronization application, and
auxiliary information,
the command word is used to indicate a synchronization operation that needs to be performed in response to receiving, by the synchronization server from the terminal device, registration information including the unique identifier of the terminal device and the unique identifier of the synchronization application to perform a second registration of the synchronization application and a determination by the synchronization server that the terminal device needs to perform file content synchronization of a file content, in response to a determination of a change including addition, deletion and/or modification in connection with the file content, and the auxiliary information comprises a parameter for implementing the synchronization operation;
parse the first synchronization message received by the receiving unit, to obtain the unique identifier of the terminal device that needs to perform file content synchronization;
determine, according to the unique identifier of the terminal device that needs to perform content synchronization, whether the terminal device that needs to perform file content synchronization is online; and
send, when the terminal device that needs to perform file content synchronization is online, a second synchronization message including the command word to the terminal device that needs to perform file content synchronization, to cause invoking by the terminal device, in response to the command word, the synchronization application registered with the push server, to perform a synchronization operation for the file content synchronization,
wherein, the at least one processor is to:
receive registration information sent by the terminal device, wherein the registration information comprises the unique identifier of the terminal device and a synchronization application name;
generate the unique identifier of the synchronization application according to the received registration information; and
send the unique identifier of the synchronization application to the terminal device.

12. A network system, wherein the network system comprises a synchronization server, a terminal device, and a push server, wherein:

the synchronization server comprises at least one memory, at least one processor coupled to the at least one memory, and to, determine a terminal device associated with a user, among terminal devices associated with the user, needs to perform file content synchronization of a file content, in response to a determination of a change including addition, deletion and/or modification in connection with the file content, the terminal device including a synchronization application invocable to perform the file content synchronization and registered by a first registration at least with the push server;

determining initiation of a synchronization operation for the terminal device, in response to receiving, by the synchronization server from the terminal device, second registration information including a unique identifier of the terminal device and a unique identifier of the synchronization application generated by the push server to perform a second registration of the synchronization application with the synchronization server, the synchronization operation to determine whether the terminal device needs to perform a file content synchronization according to the second registration information including the unique identifier of the terminal device and the unique identifier of the synchronization application; and in response to a determining that the terminal device needs to perform the file content synchronization, send a first synchronization message to the push server, wherein the first synchronization message comprises the unique identifier of the terminal device that needs to perform the file content synchronization, the unique identifier of the synchronization application, a command word for the synchronization application, and auxiliary information, wherein the command word is used to indicate a synchronization operation that needs to be performed by the terminal device that needs to perform the file content synchronization, and the auxiliary information comprises a parameter for implementing the synchronization operation;

the push server comprises at least one memory, at least one processor coupled to the at least one memory, and to, receive the first synchronization message sent by the synchronization server;

parse the first synchronization message to obtain the unique identifier of the terminal device that needs to perform the file content synchronization;

determine, according to the unique identifier of the terminal device that needs to perform the file content synchronization, whether the terminal device that needs to perform the file content synchronization is online; and send, when the terminal device that needs to perform the file content synchronization is online, a second synchronization message to the terminal device that needs to perform the file content synchronization, wherein the second synchronization message comprises the unique identifier of the synchronization application, the command word, and the auxiliary information; and the terminal device comprises at least one memory to store the synchronization application, at least one processor coupled to the at least one memory, and is to, receive the second synchronization message sent by the push server; and invoke the synchronization application to perform the file synchronization operation according to the unique identifier of the synchronization application, the command word, and the auxiliary information that are comprised in the second synchronization message, to register the synchronization application with at least the push server, the terminal device is to send first registration information to the push server before the synchronization server determines the terminal device that needs to perform file content synchronization, wherein the first registration information comprises a unique identifier of the terminal device and a synchronization application name;

the push server is to receive the first registration information sent by the terminal device; and generate the unique identifier of the synchronization application according to the first registration information and send the unique identifier of the synchronization application to the terminal device;

the terminal device is to receive the unique identifier of the synchronization application, and send second registration information to the synchronization server, wherein the second registration information comprises the unique identifier of the terminal device and the unique identifier of the synchronization application; and the synchronization server is to receive the second registration information sent by the terminal device.

* * * * *